US012390854B2

(12) United States Patent
Torigoe et al.

(10) Patent No.: US 12,390,854 B2
(45) Date of Patent: Aug. 19, 2025

(54) SILVER POWDER, METHOD OF PRODUCING SILVER POWDER, AND CONDUCTIVE PASTE

(71) Applicant: DOWA Electronics Materials Co., Ltd., Tokyo (JP)

(72) Inventors: Taro Torigoe, Okayama (JP); Hiroaki Koubu, Honjo (JP); Fumiya Abe, Takasaki (JP); Minami Kanasugi, Kosaka-machi (JP)

(73) Assignee: DOWA Electronics Materials Co., Ltd., Tokyo (JP)

( * ) Notice: Subject to any disclaimer, the term of this patent is extended or adjusted under 35 U.S.C. 154(b) by 0 days.

(21) Appl. No.: 18/715,737

(22) PCT Filed: Dec. 2, 2022

(86) PCT No.: PCT/JP2022/044630

§ 371 (c)(1),
(2) Date: Jun. 3, 2024

(87) PCT Pub. No.: WO2023/106245

PCT Pub. Date: Jun. 15, 2023

(65) Prior Publication Data

US 2025/0041936 A1 Feb. 6, 2025

(30) Foreign Application Priority Data

Dec. 6, 2021 (JP) ................................ 2021-198085
Dec. 1, 2022 (JP) ................................ 2022-193053

(51) Int. Cl.
*H01B 1/22* (2006.01)
*B22F 1/052* (2022.01)
(Continued)

(52) U.S. Cl.
CPC .............. *B22F 1/052* (2022.01); *B22F 1/065* (2022.01); *B22F 1/068* (2022.01); *B22F 1/10* (2022.01);
(Continued)

(58) Field of Classification Search
CPC .... H01B 1/00; H01B 1/02; H01B 1/22; B22F 1/068; B22F 1/09
See application file for complete search history.

(56) References Cited

U.S. PATENT DOCUMENTS 5,951,918 A * 9/1999 Kuwajima ............... H01B 1/02 252/514
11,413,685 B2 * 8/2022 Sasaki ....................... C22C 5/06

FOREIGN PATENT DOCUMENTS

JP 2005285673 A 10/2005
JP 2007254845 A 10/2007
(Continued)

OTHER PUBLICATIONS

Chao et al "Rapid synthesis of irregular sub-micron flaky silver with high flake-particle ratio: Application to silver paste", Chemical Physics Letters 708 (2018) 183-187.*
(Continued)

*Primary Examiner* — Mark Kopec
(74) *Attorney, Agent, or Firm* — KENJA IP LAW PC

(57) ABSTRACT

Provided are a silver powder that can reduce line resistance and a method of producing the same. The silver powder has a diameter at a cumulative value of 50% of 3 µm or more and a ratio of particles of 10 µm or larger of 10% or less. The silver powder includes flake-like particles having a major axis of 6 µm or more and irregularly shaped particles having a major axis of less than 6 µm, an average aspect ratio that is a ratio of average major axis relative to average thickness of the flake-like particles is 8 or more, and a shape factor that
(Continued)

10 µm is a ratio of area of a circle having average maximum length of the irregularly shaped particles as a diameter relative to average particle area of the irregularly shaped particles is 1.7 to 1.9. Ignition loss is 0.1 wt % to 0.4 wt %.

6 Claims, 8 Drawing Sheets

(51) Int. Cl.

| | |
|---|---|
| ***B22F 1/065*** | (2022.01) |
| ***B22F 1/068*** | (2022.01) |
| ***B22F 1/10*** | (2022.01) |
| ***B22F 1/145*** | (2022.01) |
| ***B22F 9/04*** | (2006.01) |
| ***B22F 9/24*** | (2006.01) |

(52) U.S. Cl.

CPC ................ *B22F 1/145* (2022.01); *B22F 9/04* (2013.01); *B22F 9/24* (2013.01); *H01B 1/22* (2013.01); *B22F 2009/042* (2013.01); *B22F 2009/043* (2013.01); *B22F 2301/255* (2013.01); *B22F 2304/10* (2013.01); *B22F 2998/10* (2013.01); *B22F 2999/00* (2013.01)

(56) References Cited

FOREIGN PATENT DOCUMENTS

| | | | | |
|---|---|---|---|---|
| JP | 2010236039 A | 10/2010 | | |
| JP | 2011208278 A | 10/2011 | | |
| JP | 2012062531 A | 3/2012 | | |
| JP | 2012102304 A | 5/2012 | | |
| JP | 2014051590 A | 3/2014 | | |
| JP | 5622543 B2 | 11/2014 | | |
| JP | 2015010256 A | 1/2015 | | |
| JP | 2020152961 A | 9/2020 | | |
| JP | 2020169386 A | 10/2020 | | |
| WO | WO-2016091104 A1 * | 6/2016 | ............. | G06F 3/041 |

OTHER PUBLICATIONS

Apr. 8, 2024, Ruling on the Patent Opposition issued by the Japan Patent Office in the corresponding Japanese Patent No. 7288133.

Feb. 14, 2023, International Search Report issued in the International Patent Application No. PCT/JP2022/044630.

Jun. 5, 2024, International Preliminary Report on Patentability issued in the International Patent Application No. PCT/JP2022/044630.

* cited by examiner

10 μm

10 μm

10 μm

10 μm

10 μm

10 μm

10 μm

10 μm

10 μm

10 μm

10 μm

10 μm

SILVER POWDER, METHOD OF PRODUCING SILVER POWDER, AND CONDUCTIVE PASTE

TECHNICAL FIELD

The present disclosure relates to a silver powder, a method of producing a silver powder, and a conductive paste.

BACKGROUND

A conductive paste, for example, may be used in order to form a conduction pattern formed on a substrate or an electrode of a substrate. The conduction pattern or the like is formed through application or the like of the conductive paste in a specific pattern or shape, followed by firing of the conductive paste. Such a conductive paste is produced by, for example, using a silver powder as conductive particles and dispersing this silver powder with a dispersion medium in the form of a paste (for example, refer to Patent Literature (PTL) 1).

PTL 1 describes a conductive paste. A case in which the conductive paste contains a silver powder that has been surface treated with a liquid fatty acid, a thermosetting resin and/or a thermoplastic resin, and a diluent is described therein. PTL 1 also describes a case in which the conductive paste contains a silver powder that has been surface treated with a liquid fatty acid and a solid fatty acid, a thermosetting resin and/or a thermoplastic resin, and a diluent. With regards to the shape of particles in the silver powder, it is disclosed that the particles may have any shape such as a spherical, flake-like, scaly, or acicular shape, for example, and that a plurality of silver powders having different shapes can be mixed and used. Moreover, PTL 1 gives an example of a conductive paste in which with regards to the shape of particles in the silver powder, a mixture of flake-like particles and spherical particles is used.

PTL 2 describes a method of quantitatively analyzing a fatty acid that is contained in an inorganic powder such as a silver powder.

CITATION LIST

Patent Literature

PTL 1: JP2012-102304A
PTL 2: JP5622543B2

SUMMARY

Technical Problem

There is demand for further reduction of line resistance in conventional techniques.

The present disclosure is made in light of the circumstances set forth above, and an object thereof is to provide a silver powder that can reduce line resistance and a method of producing the same.

Solution to Problem

Silver powders according to the present disclosure for achieving the object set forth above are as follows.

(1) A silver powder that in a volume-based particle size distribution measured using a laser diffraction/scattering particle size distribution measurement instrument, has a diameter at a cumulative value of 50% of 3 μm or more and a ratio of particles of 10 μm or larger of 10% or less, wherein with regards to particle shape observed by image analysis based on an SEM image, the silver powder includes flake-like particles having a major axis of 6 μm or more and irregularly shaped particles having a major axis of less than 6 μm, an average aspect ratio that is a ratio of an average major axis of the flake-like particles relative to an average thickness of the flake-like particles is 8 or more, and a shape factor that is a ratio of an area of a circle having an average maximum length of the irregularly shaped particles as a diameter relative to an average particle area of the irregularly shaped particles is not less than 1.7 and not more than 1.9, and the silver powder has an ignition loss of not less than 0.1 wt % and not more than 0.4 wt %.

(2) The silver powder according to the foregoing (1), wherein, in the particle size distribution, a ratio of a value of a difference determined by subtracting a diameter at a cumulative value of 10% from a diameter at a cumulative value of 90% relative to the diameter at the cumulative value of 50% is 2 or more.

Moreover, methods of producing a silver powder according to the present disclosure for achieving the object set forth above are as follows.

(3) A method of producing a silver powder comprising:

a reduction step of adding a reductant to a silver ammine complex aqueous solution to obtain a first liquid;

a surface treatment agent addition step of adding a surface treatment agent to the first liquid to obtain a second liquid;

a separation step of obtaining a first silver powder through separation from the second liquid and drying; and a flaking step of stirring the first powder, a lubricant, and media inside of a vessel to obtain a second silver powder in which the first silver powder has undergone flattening, wherein an additive amount of the surface treatment agent in the surface treatment agent addition step is not less than 0.05 wt % and not more than 0.15 wt % relative to weight of silver contained in the silver ammine complex aqueous solution, a specific surface area diameter calculated from specific surface area determined by the BET method after the first silver powder is mixed with the lubricant is not less than 1.3 μm and not more than 2.0 μm, a diameter at a cumulative value of 50% in a volume-based particle size distribution measured using a laser diffraction/scattering particle size distribution measurement instrument after the first silver powder is mixed with the lubricant is not less than 1.5 times and not more than 3 times the specific surface area diameter, and an additive amount of the lubricant in the flaking step and the additive amount of the surface treatment agent are, in total, not less than 0.1 wt % and not more than 0.4 wt % relative to weight of silver in the first silver powder.

(4) A method of producing a silver powder comprising a flaking step of stirring a first silver powder that is coated with a surface treatment agent, a lubricant, and media inside of a vessel to obtain a second silver powder in which the first silver powder has undergone flattening, wherein a specific surface area diameter calculated from specific surface area determined by the BET method after the first silver powder is mixed with the lubricant is not less than 1.3 μm and not more than 2.0 μm, a diameter at a cumulative value of 50% in a volume-based particle size distribution measured using a laser diffraction/scattering particle size distribution measurement instrument after the first silver powder is mixed with the lubricant is not less than 1.5 times and not more than 3 times the specific surface area diameter, and an additive amount of the lubricant and an attached amount of the surface treatment agent are, in total, not less than 0.1 wt % and not more than 0.4 wt % relative to weight of silver in the first silver powder.

(5) The method of producing a silver powder according to the foregoing (3) or (4), wherein with regards to particle shape of the second silver powder observed by image analysis based on an SEM image, a number of flake-like particles having a major axis that is not less than 4 times the specific surface area diameter of the first silver powder is not less than 1% and not more than 13% of a total number of particles serving as subjects in the image analysis, and in a volume-based particle size distribution measured using a laser diffraction/scattering particle size distribution measurement instrument, the second silver powder has a diameter at a cumulative value of 50% of 3 μm or more and a ratio of particles of 10 μm or larger of 10% or less.

(6) The method of producing a silver powder according to any one of the foregoing (3) to (5), wherein the additive amount of the lubricant is not less than 0.05 wt % and not more than 0.3 wt % relative to weight of the first silver powder.

(7) The method of producing a silver powder according to any one of the foregoing (3) to (6), wherein, in a volume-based particle size distribution measured using a laser diffraction/scattering particle size distribution measurement instrument after the first silver powder is mixed with the lubricant, a ratio of particles of 10 μm or larger is 10% or less.

(8) A conductive paste comprising: the silver powder according to the foregoing (1) or (2); a resin; and a solvent.

(9) The conductive paste according to the foregoing (8), further comprising a spherical silver powder.

Advantageous Effect

It is possible to provide a silver powder, a method of producing the same, and a conductive paste that can reduce line resistance.

DETAILED DESCRIPTION

Figure 1:
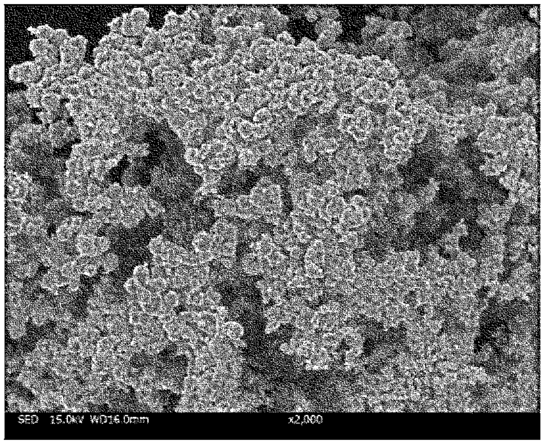
FIG. 1 is an SEM image (×2,000) of a first silver powder according to Example 1.

The following describes a silver powder and a method of producing a silver powder according to an embodiment of the present disclosure with reference to the drawings.

The silver powder according to the present embodiment is suitable for use as a conductive filler for a conductive paste. A conductive paste in which the silver powder according to the present embodiment is used can be used in formation of a conduction pattern on a substrate or in formation of an electrode. A conductive paste in which the silver powder according to the present embodiment is used can, for example, be printed onto a substrate by screen printing, offset printing, photolithography, or the like so as to form a conductive film such as a conduction pattern or an electrode (hereinafter, also referred to simply as a conductive film).

The silver powder according to the present embodiment is described in detail below.

In a volume-based particle size distribution measured using a laser diffraction/scattering particle size distribution measurement instrument, the silver powder according to the present embodiment has a diameter at a cumulative value of 50% of 3 μm or more and a ratio of particles of 10 μm or larger of 10% or less. The diameter at a cumulative value of 50% is preferably 4 μm or less.

The volume-based particle size distribution of the silver powder is taken to be a volume-based particle size distribution that is measured using a laser diffraction/scattering particle size distribution measurement instrument. In the present embodiment, a case in which a Microtrac particle size distribution measurement instrument MT-3300EXII (hereinafter, also referred to simply as a particle size distribution measurement instrument) produced by MicrotracBEL Corp. is used as a laser diffraction/scattering particle diameter distribution measurement instrument is described below as an example. Values measured with the silver powder dispersed in a specific dispersion medium (i.e., in a wet state) may be used for the particle size distribution of the silver powder. In the present embodiment, 0.1 g of the silver powder is added to 40 mL of isopropyl alcohol serving as a dispersion medium, is subjected to 2 minutes of dispersing by an ultrasonic homogenizer (US-150T produced by NIHONSEIKI KAISHA LTD.; 19.5 kHz; tip diameter: 18 mm) to prepare a dispersion, and then this dispersion is supplied to the particle size distribution measurement instrument to measure a particle size distribution of the silver powder.

The diameter at a cumulative value of 50% referred to in relation to the particle size distribution in the present specification is what is also referred to as the median diameter. The diameter at a cumulative value of 50% is the diameter at which a volume-based cumulative value for the amount of particles taken from a small particle diameter side of the particle size distribution reaches 50%. Likewise, the diameter at a cumulative value of 10% is the diameter at which a volume-based cumulative value for the amount of particles taken from a small particle diameter side of the particle size distribution reaches 10%. The diameter at a cumulative value of 90% is the diameter at which a volume-based cumulative value for the amount of particles taken from a small particle diameter side of the particle size distribution reaches 90%. In the following description, the diameters at volume-based cumulative values of 10%, 50%, and 90% are also referred to respectively as D10, D50, and D90. The ratio of particles of 10 μm or larger is also taken to be a volume-based value.

In the volume-based particle size distribution of the silver powder according to the present embodiment, it is preferable that a ratio of a value of a difference determined by subtracting the diameter at a cumulative value of 10% from the diameter at a cumulative value of 90% relative to the diameter at a cumulative value of 50% is 2 or more. In other words, the silver powder has a suitably broad particle size distribution. This results in denser packing of particles when a conductive film is formed and during subsequent sintering, and thus makes it possible to suitably achieve reduction of line resistance.

The silver powder according to the present embodiment has an ignition loss of not less than 0.1 wt % and not more than 0.4 wt %.

When the silver powder according to the present embodiment is used as a conductive filler of a conductive paste that can reduce line resistance, it is possible to achieve reduction of line resistance. Setting the ignition loss of the silver powder according to the present embodiment as 0.4 wt % or less makes it less likely that voids will form and causes dense packing of particles during sintering performed after formation of a conductive film, and thus makes it possible to suitably achieve reduction of line resistance. Setting the ignition loss as 0.1 wt % or more can inhibit oxidation of silver from occurring up until a conduction pattern is formed, and thus makes it possible to suitably achieve reduction of line resistance. It is also possible to suitably maintain dispersibility when the silver powder is dispersed as a conductive filler together with a base material in order to form a conductive paste. Moreover, the presence of flake-like particles having a specific shape and irregularly shaped particles as previously described results in dense packing of particles when a conductive film is formed and during subsequent sintering, and thus makes it possible to suitably achieve reduction of line resistance. Furthermore, setting the ignition loss of the silver powder as a small value of not less than 0.1 wt % and not more than 0.4 wt % also has an effect of maintaining the amount of silver in paste production while also increasing choice in terms of constituents other than the silver powder. The ignition loss is more preferably set as 0.35 wt % or less.

Measurement of the ignition loss (hereinafter, also referred to as Ig-Loss) of the silver powder is performed based on the reduction of mass of a sample of the silver powder after heating of the sample. In the present embodiment, a silver powder sample is first precisely weighed (weighed value: w1), is loaded into a magnetic crucible, and is heated to 800° C. Heating is performed at 800° C. for 30 minutes so as to allow sufficient time until a constant quantity is reached. Thereafter, the sample is cooled and reweighed (weighed value: w2). The ignition loss is determined by substituting the weighed values w1 and w2 into the following equation (equation 1). In the present embodiment, the weighed value w1 is taken to be 3 g.

$$\text{Ignition loss (mass \%)} = (w1 - w2)/w1 \times 100 \quad \text{(Equation 1)}$$

In the present embodiment, an image that is recorded using a scanning electron microscope (JEOL JSM-IT300LV produced by JEOL Ltd.; hereafter, also referred to simply as an SEM) is used as an SEM image of the silver powder or silver particles.

The SEM image is subjected to image analysis as described further below. Both an SEM image for determining the shape of particles in plan view and an SEM image for determining the cross-sectional shape of particles are acquired as SEM images.

When recording an SEM image for determining the shape of particles in plan view, the silver powder may be dispersed in advance and then an SEM image may be recorded with respect to the dispersed silver powder. In the present embodiment, recording of an SEM image is performed by adding 0.1 g of the silver powder to 100 mL of isopropyl alcohol (IPA) serving as a dispersion medium and performing two minutes of dispersing treatment using the above-described ultrasonic homogenizer to prepare a dispersion. This dispersion is then dripped onto a stage of the SEM, the dispersion medium is caused to evaporate, and then measurement by the SEM is performed. In the present embodiment, the magnification of the plan view SEM image is taken to be ×1,000 or ×2,000.

With regards to particles in the SEM image, image analysis software or the like is used to select particles for which the entire outer shape thereof is observed and to analyze the size and shape of these particles. In the present embodiment, measurements are performed using image analysis-type particle size distribution measurement software (Mac-View produced by Mountech Co., Ltd.), which is one example of image analysis software. The following describes the method and procedure of image analysis in a case in which the above-described image analysis-type particle size distribution measurement software is used.

In the present embodiment, the maximum length, major axis, and particle area of silver particles are values determined by image analysis based on a plan view SEM image. In the present embodiment, the minor axis may also be determined by image analysis in addition to the major axis, etc. Furthermore, the circularity of silver particles may also be determined by image analysis as necessary.

The maximum length is the maximum length for the length of a side of a circumscribing quadrangle. The major axis is the long side of a circumscribing quadrangle of minimum area. The minor axis is the short side of a circumscribing quadrangle of minimum area. The particle area is the area of an image of an individual particle in the plan view SEM image, and more specifically is the projected area of a silver particle. The circularity is a value determined by dividing the square of the perimeter of a circle of equal area to the projected area of a particle by the square of the perimeter of the particle in an image of the particle.

When performing measurements, an image is recorded by the SEM such that 30 or more measured particles are included in one viewing field of an SEM image (i.e., in one SEM image). SEM images are recorded for a plurality of viewing fields. With respect to 400 or more particles, in total, for which the entire outer shape thereof is observed, the outer shapes of these particles are traced so as to measure the maximum length, major axis, minor axis, and particle area of these particles. The average maximum length, average major axis, average minor axis, average particle area, and average circularity are respectively average values of the maximum length, major axis, minor axis, particle area, and circularity of the particles serving as evaluation subjects.

In the present embodiment, the term "shape factor" refers to a ratio of the area of a virtual circle having the average maximum length as a diameter relative to the average particle area of the silver particles. The shape factor is a value determined by dividing the area of the virtual circle by the average particle area. A calculation equation for the shape factor is expressed by:

$$\pi(\text{average maximum length}/2)^2/\text{average particle area}.$$

With regards to particle shape observed by image analysis based on an SEM image, the silver powder according to the present embodiment includes flake-like particles having a major axis of 6 μm or more and irregularly shaped particles having a major axis of less than 6 μm.

In the silver powder according to the present embodiment, an average aspect ratio that is a ratio of the average major axis of the flake-like particles relative to the average thickness of the flake-like particles is 8 or more. Note that the average thickness is a value that is determined based on a particle cross-section SEM image. Measurement for a particle cross-section is described further below.

In the silver powder according to the present embodiment, a shape factor that is a ratio of the area of a circle having the average maximum length of the irregularly shaped particles as a diameter relative to the average particle area of the irregularly shaped particles is not less than 1.7 and not more than 1.9.

The term flake-like particles as used in the present embodiment refers to particles having a major axis of 6 μm or more and is inclusive not only of particles having a shape that is flake-like, but also of particles that are not flake-like. The average aspect ratio of the flake-like particles in the present embodiment is 8 or more. Particles having a major axis of 6 μm or more are referred to as flake-like particles in order to facilitate description since the average shape of particles having a major axis of 6 μm or more can be said to be flake-like. Note that the average aspect ratio (=average major axis/average thickness) of the flake-like particles is the average of aspect ratios determined with only particles having a major axis of 6 μm or more as subjects among silver particles in the silver powder.

The term "irregularly shaped particles" as used in the present embodiment refers to particles having a major axis of less than 6 μm and is inclusive not only of particles that are irregularly shaped, but also of particles that are flake-like and particles that are not irregularly shaped. The shape factor of the irregularly shaped particles in the present embodiment is not less than 1.7 and not more than 1.9. Particles having a major axis of less than 6 μm are referred to as irregularly shaped particles in order to facilitate description since the average shape of particles having a major axis of less than 6 μm can be said to be irregular. Note that the shape factor of the irregularly shaped particles is the shape factor determined with only particles having a major axis of less than 6 μm as subjects.

Note that when referring to the average major axis of the flake-like particles, the average maximum length of the irregularly shaped particles, and so forth in the present embodiment, this means the average of the major axis or the maximum length of only the flake-like particles or the irregularly shaped particles. The same applies for other properties (inclusive of shape factor and average aspect ratio) not given as examples.

The silver powder according to the present embodiment is referred to as a mixed powder in a case in which the above-described irregularly shaped particles and the above-described flake-like particles are mixed and in which at least half of the particles are irregularly shaped particles. The mixing proportions are such that at least half of the particles are irregularly shaped particles. The number proportion of flake-like particles that are distinguished by having a major axis of 6 μm or more as described above upon observation of particles in an SEM image is preferably not less than 1% and not more than 20%, and more preferably not less than 1% and not more than 13%.

In the present embodiment, the thickness of a silver particle is a value determined by image analysis based on a particle cross-section SEM image.

An SEM image for determining the cross-sectional shape of particles may be obtained by embedding silver particles in resin, sectioning the resultant product using a microtome to prepare a resin embedded section, and recording an image of cross-sections of silver particles in this section. In the present embodiment, the magnification of the particle cross-section SEM image is set as ×2,000.

The thickness is the length of the minor axis when an image of an individual particle in the particle cross-section SEM image is sandwiched between two sets of parallel lines. The thickness measurement is performed by recording an image of 100 or more particles per one type of silver powder, and then measuring the thickness with respect to a cross-section of each of 100 or more particles for which the entire outer shape thereof is observed and that are regarded as flake-like particles (i.e., cross-sections of particles having a major axis of 6 μm or more). The average thickness of the flake-like particles is an average value of the thicknesses of these particles.

In the present embodiment, the average aspect ratio of the flake-like particles is a value determined by dividing the above-described average major axis by the above-described average thickness.

The tap density of the silver powder is preferably 4.0 g/mL or more. The tap density of the silver powder is the apparent density of the silver powder in a vessel after a specific amount of the silver powder is measured out, the measured-out silver powder is loaded into a vessel of a specific volume, and an operation of dropping the vessel with a specific drop is performed a specific number of times (hereinafter, also referred to as "after tapping"). The tap density of the silver powder is determined by dividing the weight of the silver powder in the vessel by the apparent volume of the silver powder in the vessel.

In the present embodiment, the tap density of the silver powder is taken to be a value that is determined using a tap density measurement instrument (bulk specific gravity measurement instrument SS-DA-2 produced by Shibayama Scientific Co., Ltd.) by measuring out 30 g of the silver powder, loading the silver powder into a vessel (20 mL test tube), performing tapping 1,000 times with a drop of 20 mm, and then dividing the weight of the silver powder (30 g) by the apparent volume (mL) of the silver powder after tapping. Note that the tap density is expressed in units of "g/mL".

The silver powder according to the present embodiment is suitable for use as a conductive filler for a conductive paste. Production of a conductive paste using the silver powder according to the present embodiment is performed by dispersing the silver powder in a resin (binder) serving as a base material and a solvent. The conductive paste in the present embodiment contains the silver powder according to the present embodiment, a resin, and a solvent. Moreover, the conductive paste in the present embodiment preferably further contains a spherical silver powder as a separate component to the silver powder according to the present embodiment. The proportion in which the spherical silver powder is mixed relative to the silver powder according to the present embodiment is, as a weight ratio, preferably 1:9 to 9:1, and more preferably 4:6 to 8:2.

The "spherical silver powder" that is mixed with the silver powder according to the present embodiment when obtaining a conductive paste is a silver powder for which the average shape factor of 400 or more particles observed by image analysis based on an SEM image as previously described is within a range of not less than 1.0 and less than 1.7. The average shape factor of the spherical silver powder is preferably 1.65 or less. The spherical silver powder has a shape closer to a spherical shape than irregularly shaped silver powder. The average aspect ratio of the spherical silver powder is preferably 1.5 or less. The average Heywood diameter according to image analysis based on an SEM image is preferably 0.1 μm to 1.0 μm. The diameter at a cumulative value of 50% (D50) in a volume-based particle size distribution measured using a laser diffraction/scattering particle size distribution measurement instrument is preferably 0.3 μm to 1.3 μm.

Examples of the resin used in production of the conductive paste include epoxy resin, acrylic resin, polyester resin, polyimide resin, polyurethane resin, phenoxy resin, silicone resin, and ethyl cellulose. Two or more types of resins may be used at the same time.

Examples of the solvent (i.e., the dispersion medium) used in production of the conductive paste include terpineol, butyl carbitol, butyl carbitol acetate, and texanol. Two or more types of solvents may be used at the same time.

The conductive paste may contain components other than those described above. For example, the conductive paste can contain glass frit, a dispersant, a surfactant, and/or a viscosity modifier.

Production of the conductive paste (i.e., dispersing and/or kneading) may be performed using an ultrasonic disperser, a disper, a three-roll mill, a ball mill, a bead mill, a twin-screw kneader, a planetary stirrer, or the like.

The conductive paste in which the silver powder according to the present embodiment is used is suitable for formation of a conductive film (i.e., formation of a conduction pattern on a substrate or formation of an electrode). For example, the conductive paste can suitably be used to form a conductive film by applying or printing the conductive paste directly onto any of various types of substrates such as a silicon wafer for a solar cell, a film for a touch panel, or glass for an EL element or by further providing a transparent conductive film on a substrate as necessary and then applying or printing the conductive paste onto that film. The conductive film obtained using the conductive paste of the present disclosure is suitable for use in electrode and electrical wiring applications such as current-collecting electrodes of solar cells, external electrodes of chip-type electronic components, RFID, electromagnetic wave shields, oscillator adhesion, membrane switches, and electroluminescence.

The conductive paste in which the silver powder according to the present embodiment is used can be used to form a conductive film of a desired shape through printing onto a substrate by screen printing, offset printing, photolithography, or the like, for example.

A value measured using a rotational viscometer can be adopted as the viscosity of the conductive paste. In the present embodiment, the viscosity is measured under the following conditions using a 5XHBDV-IIIUC produced by Brookfield Engineering as a viscometer. A CPE-52 is used as a cone spindle. The measurement temperature is set as 25° C., and the rotation speed of the cone spindle is set as 1 rpm. A value at a point after 5 minutes of rotation of the cone spindle is adopted as a value for viscosity.

The conductive paste is applied by a screen printing machine or the like so as to obtain a film of the conductive paste and is subsequently fired to obtain a conductive film. The conductive paste that has undergone firing (i.e., the conductive film) is typically required to have low line resistance, specific resistance, or volume resistivity. Measurement of line resistance can be performed as described below. Moreover, various evaluations of the conductive film can be performed using line width and wire aspect ratio described below.

The line resistance is determined by forming a film of the conductive paste having a specific shape, further performing firing of this film to obtain a conductive film as a conduction pattern, and measuring a resistance value of the conductive film.

In the present embodiment, a value measured by the following procedure is adopted as the line resistance. First, the silver powder that is an evaluation subject is used to produce a conductive paste. This conductive paste is then used to print 9 line patterns having a design width (line width) of 25 μm and a length of 105 mm onto an alumina substrate using a screen printing machine (MT-320T produced by Micro-tec Co., Ltd.) with a squeegee pressure of 0.18 MPa and at a rate of 150 mm/s so as to form a film of the conductive paste. This film is then dried at 150° C. for 10 minutes using an air circulation dryer and is subsequently further heated and cured (fired) at 200° C. for 30 minutes to form a line-shaped conductive film.

The line resistance is then determined as a resistance value of the conductive film using a digital multimeter (R6551 produced by Advantest Corporation).

The wire aspect ratio is determined by dividing the thickness of the conductive film by the line width of the conductive film. The thickness of the conductive film, the line width of the conductive film, and the cross-sectional area of the conductive film are measured at a central location in a length direction of the film using a laser microscope (VKX-1000 produced by Keyence Corporation).

The method of producing a silver powder according to the present embodiment is described in detail below.

One example of the method of producing a silver powder according to the present embodiment includes a flaking step of stirring a first silver powder that is coated with a surface treatment agent, a lubricant, and media inside of a vessel to obtain a second silver powder in which the first silver powder has undergone flattening. A specific surface area diameter calculated from specific surface area determined by the BET method after the first silver powder is mixed with the lubricant is not less than 1.3 μm and not more than 2.0 μm. A diameter at a cumulative value of 50% in a volume-based particle size distribution measured using a laser diffraction/scattering particle size distribution measurement instrument after the first silver powder is mixed with the lubricant is not less than 1.5 times and not more than 3 times the specific surface area diameter. The first silver powder is produced through a reduction step of adding a reductant to a silver ammine complex aqueous solution to obtain a first liquid, a surface treatment agent addition step of adding a surface treatment agent to the first liquid to obtain a second liquid, and a separation step of obtaining a first silver powder through separation from the second liquid and drying. The additive amount of the lubricant in the flaking step and the additive amount of the surface treatment agent in the surface treatment agent addition step are, in total, not less than 0.1 wt % and not more than 0.4 wt % relative to the weight of silver in the first silver powder. Moreover, the additive amount of the lubricant in the flaking step and the attached amount of the surface treatment agent in the first silver powder are, in total, not less than 0.1 wt % and not more than 0.4 wt % relative to the weight of silver in the first silver powder.

The specific surface area diameter is calculated using the following equation (equation 2) based on the density of silver and the specific surface area A ($m^2/g$) determined by the BET method after the first silver powder is mixed with the lubricant. The specific surface area diameter in the present embodiment is what is also referred to as the BET diameter. The value of the density of silver is taken to be 10.50 (g/cm).

$$\text{Specific surface area diameter } (\mu m) = 6/(A \times 10.50) \quad \text{(Equation 2)}$$

The specific surface area of a silver powder (first silver powder after mixing with lubricant and second silver powder) is taken to be the specific surface area measured by the BET method. Measurement of specific surface area according to the BET method may be performed using a specific surface area measurement instrument that implements such measurement. In the present embodiment, a case in which a value measured using a Macsorb HM-model 1210 produced by Mountech Co., Ltd. as a measurement instrument for specific surface area according to the BET method is adopted is described below as an example. In measurement of the specific surface area in the present embodiment, He—$N_2$ mixed gas (30% nitrogen) is passed inside the measurement instrument for 10 minutes at 60° C. to perform deaeration, and then a value measured by the single-point BET method is adopted.

The diameter at a cumulative value of 50% that is compared to the specific surface area diameter is taken to be a value measured using a laser diffraction/scattering particle size distribution measurement instrument after the first silver powder is mixed with the lubricant. Note that "after the first silver powder is mixed with the lubricant" means after the first silver powder is loaded into a Henschel mixer (FM Mixer produced by Mitsui Mining Co., Ltd.; model: FM75; SO stirring blade used), the same lubricant as used during subsequently described flaking is added in the same amount, and 20 minutes of stirring and mixing are performed at a stirring blade rotation speed of 2,200 rpm. The resultant silver powder is also referred to as a lubricant-mixed silver powder. The lubricant-mixed silver powder is measured using a Microtrac particle size distribution measurement instrument MT-3300EXII produced by MicrotracBEL Corp. as a laser diffraction/scattering particle diameter distribution measurement instrument. Measurement of a particle size distribution is performed by sampling 0.1 g of the silver powder (lubricant-mixed silver powder), adding the silver powder to 40 mL of isopropyl alcohol serving as a dispersion medium, performing 2 minutes of dispersing by an ultrasonic homogenizer (US-150T produced by NIHON-SEIKI KAISHA LTD.; 19.5 kHz; tip diameter: 18 mm) to prepare a dispersion, and then supplying this dispersion to the particle size distribution measurement instrument to measure a particle size distribution of the silver powder. Directly before addition of the lubricant, stirring may be performed for a short time (for example, 1 minute at 900 rpm) compared to mixing after lubricant addition in order to break up the first silver powder to a suitable degree.

The method of producing a silver powder according to the present embodiment enables production of the silver powder according to the present embodiment. The ignition loss of a silver powder that is produced through this method of producing a silver powder can be set as not less than 0.1 wt % and not more than 0.4 wt %.

In the method of producing a silver powder according to the present embodiment, the first silver powder can be produced through a production method that includes a reduction step of adding a reductant to a silver ammine complex aqueous solution to obtain a first liquid, a surface treatment agent addition step of adding a surface treatment agent to the first liquid to obtain a second liquid, and a separation step of obtaining a first silver powder through separation from the second liquid and drying. The additive amount of the surface treatment agent in the surface treatment agent addition step is not less than 0.05 wt % and not more than 0.15 wt % relative to the weight of silver contained in the silver ammine complex aqueous solution.

Through the production method including the reduction step, the surface treatment agent addition step, and the separation step in this manner, it is possible to obtain a first silver powder with which a specific surface area diameter calculated from specific surface area determined by the BET method after the first silver powder is mixed with the lubricant (after the subsequently described lubricant mixing step) is not less than 1.3 μm and not more than 2.0 μm and with which a diameter at a cumulative value of 50% in a volume-based particle size distribution measured using a laser diffraction/scattering particle size distribution measurement instrument after the first silver powder is mixed with the lubricant is not less than 1.5 times and not more than 3 times the specific surface area diameter. In other words, it is possible to obtain a first silver powder that when placed in the form of a lubricant-mixed silver powder, has a specific surface area diameter of not less than 1.3 μm and not more than 2.0 μm and a diameter at a cumulative value of 50% that is not less than 1.5 times and not more than 3 times the specific surface area diameter. This first silver powder (lubricant-mixed silver powder) is coated with the surface treatment agent.

Note that in the method of producing a silver powder according to the present embodiment, the additive amount of the lubricant in the flaking step and the additive amount of the surface treatment agent in the surface treatment agent addition step are, in total, not less than 0.1 wt % and not more than 0.4 wt % relative to the weight of silver in the first silver powder. Moreover, the additive amount of the lubricant in the flaking step and the attached amount of the surface treatment agent in the first silver powder are, in total, not less than 0.1 wt % and not more than 0.4 wt % relative to the weight of silver in the first silver powder. This makes it possible to set the ignition loss of the silver powder as not less than 0.1 wt % and not more than 0.4 wt %.

The reduction step is a step of adding a reductant to a silver ammine complex aqueous solution to obtain a first liquid. Examples of the reductant include hydrazine, hydrazine compounds, and formalin. In the reduction step, addition of the reductant causes reduction of silver ions and precipitation of particles of silver (hereinafter, referred to as core particles).

The silver ammine complex aqueous solution may be an aqueous solution that is produced by adding ammonia water or an ammonium salt to a feedstock liquid such as a silver nitrate aqueous solution or a silver oxide suspension. A pH modifier may be added to the feedstock liquid or the silver ammine complex aqueous solution. A typical acid or base may be used as the pH modifier. Examples of the pH modifier include nitric acid and sodium hydroxide.

The surface treatment agent addition step is a step of adding a surface treatment agent to the first liquid to obtain a second liquid. In the surface treatment agent addition step, the surfaces of the core particles become coated by the surface treatment agent through adsorption or the like. In the following description, core particles that are coated with the surface treatment agent are referred to as first silver particles. The second liquid is a suspension (also referred to as a slurry) or a dispersion in which the first silver particles are dispersed.

Examples of the surface treatment agent include fatty acids such as stearic acid, palmitic acid, linoleic acid, linolenic acid, and oleic acid. Of these examples, unsaturated fatty acids such as linoleic acid, linolenic acid, and oleic acid, in particular, are particularly preferable.

Note that in the method of producing a silver powder according to the present embodiment, the specific surface area diameter of the first silver powder is controlled such as to be not less than 1.3 μm and not more than 2.0 μm. Moreover, the specific surface area diameter calculated from specific surface area determined by the BET method after the first silver powder is mixed with the lubricant is also controlled to not less than 1.3 μm and not more than 2.0 μm. In other words, the specific surface area diameter of the first silver powder is controlled such as to be within the range set forth above in the reduction step and the surface treatment agent addition step. The specific surface area diameter of the first silver powder is mainly controlled through control of the precipitation conditions (for example, the rate of precipitation and the rate of reduction) of the core particles. One specific example of control of precipitation conditions of the core particles is adjusting the addition rate of the reductant with respect to the silver ammine complex aqueous solution. For example, increasing the addition rate of the reductant increases the specific surface area diameter. Decreasing the addition rate of the reductant decreases the specific surface area diameter.

The diameter at a cumulative value of 50% in a volume-based particle size distribution of the first silver powder measured using a laser diffraction/scattering particle size distribution measurement instrument is controlled such as to be not less than 1.5 times and not more than 3 times the specific surface area diameter. The diameter at a cumulative value of 50% is more preferably not less than 1.5 times and not more than 2.5 times the specific surface area diameter. The ratio of the diameter at a cumulative value of 50% relative to the specific surface area diameter indicates the degree of aggregation. Moreover, in the volume-based particle size distribution measured using the laser diffraction/scattering particle size distribution measurement instrument, the ratio of particles of 10 μm or larger is preferably 10% or less. Note that in a case in which a lubricant is used in the flaking step, values measured with respect to the silver powder after mixing of the lubricant (lubricant-mixed silver powder) are adopted for the volume-based particle size distribution measured using the laser diffraction/scattering particle size distribution measurement instrument in order to correctly understand the silver powder that is used in the flaking step.

The additive amount of the surface treatment agent in the surface treatment agent addition step is not less than 0.05 wt % and not more than 0.15 wt % relative to the weight of silver contained in the silver ammine complex aqueous solution.

The attached amount of the surface treatment agent that becomes attached to the core particles through the surface treatment agent addition step and remains after a drying step is taken to be a value that is measured with respect to the first silver powder after the subsequently described drying step in a state in which the type of surface treatment agent has been identified. The attachment amount of the surface treatment agent is measured as described below and is not more than the above-described additive amount of the surface treatment agent. Note that the type of surface treatment agent can be identified through qualitative analysis by gas chromatography of surface treatment agent volatilized upon heating of the silver powder.

The attached amount of the surface treatment agent in the silver powder is determined in accordance with a method of quantitatively analyzing a fatty acid that is described in PTL 2. First, the silver powder is dissolved in an acid, and then an organic solvent is mixed therewith and all of the surface treatment agent is extracted into this organic solvent phase. Thereafter, a specific amount of the organic solvent phase is sampled and is subjected to evaporation and drying. The attached amount of the surface treatment agent can then be determined through calculation by using a carbon/sulfur analyzer to measure the amount of carbon in the residual solid material.

For example, in a case in which the surface treatment agent is identified as stearic acid and in which the first silver powder does not contain a carbon source other than stearic acid, the measurement method of stearic acid is as follows.

A calibration curve is determined by using the carbon/sulfur analyzer to measure the amount of carbon (intensity) in each of standard solutions of differing stearic acid content (mg), and the gradient of this calibration curve is taken to be A (intensity/mg). The weight X (mg) and concentration Y (%) of stearic acid in the silver powder can be calculated by the following equations (equations 3 and 4) for a case in which a specific amount b (mL) is sampled from the total amount of organic solvent a (mL) into which the treatment agent is extracted through treatment of the silver powder described above and in which the amount of carbon determined through measurement of residual solid material of this sample is taken to be C (intensity) and the amount of the silver powder that was dissolved in the acid is taken to be M (g).

$$X\,(\mathrm{mg}) = (C/A \times a/b) \quad \text{(Equation 3)}$$

$$Y\,(\%) = X/(M \times 1000) \times 100 \quad \text{(Equation 4)}$$

In a case in which oleic acid is used as the treatment agent, the attached amount thereof can be determined by measuring the amount of carbon in the same manner as described above. Calculation for oleic acid can also be performed using the calibration curve for stearic acid. Since the molecular weight of stearic acid is 284.48, with the amount of carbon therein being 216.19, and since the molecular weight of oleic acid is 282.46, with the amount of carbon therein being 216.19, the oleic acid concentration Y' is calculated by the following equation (equation 5).

$$\text{Oleic acid concentation } Y' \text{ (\%)} = Y \times (216.19/284.48) \times (282.46/216.19) \quad \text{(Equation 5)}$$

The attached amount of the surface treatment agent is preferably not less than 0.01 wt % and not more than 0.11 wt % relative to the weight of the silver powder. The attached amount of the surface treatment agent can be converted to an attached amount of the surface treatment agent relative to the weight of silver by regarding a weight determined by subtracting the weight of the surface treatment agent from the weight of the silver powder as the weight of silver. The attached amount of the surface treatment agent is preferably not less than 0.01 wt % and not more than 0.12 wt % relative to the weight of silver.

The separation step is a step of separating the first silver particles from the second liquid. In the following description, an assembly of the first silver particles that have been separated and dried in the separation step is referred to as a first silver powder.

In the separation step, a washing and recovery step of recovering the first silver particles from the second liquid and washing the first silver particles and a drying step of drying the first silver particles may be performed.

In the washing and recovery step, the second liquid is dehydrated to obtain an assembly of the first silver particles as a cake, and then the cake of the assembly of first silver particles is washed, for example. The washing in the washing and recovery step may be performed using pure water, for example. The dehydration in the washing and recovery step can be performed by decantation or filter pressing, for example. A completion point of the washing may be judged using the electrical conductivity of washing water. Specifically, the washing may be judged to be complete once the electrical conductivity of washing water is not more than a specific value. The first silver particles that have been washed may be subjected to the drying step in an aggregated state such as in the form of a cake.

In the drying step, the assembly of first silver particles in an aggregated state that contains water is dried. The drying step may be performed by vacuum drying or using an airflow-type dryer. In the drying step, high-pressure airflow may be blown against the first silver powder, or the cake or the silver powder in the drying process may be loaded into a stirring machine having a stirring rotor or a milling machine having a milling rotor and may be stirred so as to perform an operation of imparting dispersing force to the cake or the silver powder in the drying process and promoting dispersion and drying.

Note that the temperature of the silver powder in the drying step should be set as 100° C. or lower. In a situation in which the temperature of the silver powder exceeds 100° C., sintering of silver particles in the silver powder may occur.

Since the first silver powder after drying may be clumped together, a disintegration, milling, or classification operation aimed at improving handleability of the first silver powder, for example, may be performed concurrently to the drying step or after the drying step. Note that improving handleability of the first silver powder means breaking up the first silver powder to a suitable degree so as to ensure fluidity of a level such that in the subsequently described flaking step, addition of the subsequently described lubricant and an operation of supplying the first silver powder into a device are not impaired and so as to cause efficient progress of treatment in the device, for example, and does not mean that the first silver powder is completely broken up until there is no aggregation thereof.

Note that the term "aggregated state" as used with respect to the silver powder according to the present embodiment means a state in which the value (μm) of D50 of the lubricant-mixed silver powder is not less than 1.5 times the value of the specific surface area diameter (μm) of the lubricant-mixed silver powder. Irregularly shaped particles are formed in the flaking step as a result of such an aggregated state. Note that since excessive aggregation results in a higher proportion of flake-like particles in the flaking step, the value of D50 is preferably not more than 3 times, and more preferably not more than 2.5 times the specific surface area diameter.

The flaking step is a step of stirring the first silver powder, a lubricant, and media inside of a vessel to cause flattening of the first silver powder. The flaking step includes a lubricant mixing step of mixing the first silver powder and the lubricant with the aim of uniformly dispersing the lubricant on the surface of the first silver powder. The lubricant mixing step may be performed by adding the lubricant to the first silver powder in a state in which the first silver powder has been broken up to a suitable degree through disintegration and using a disintegrator to perform stirring and mixing thereof. For example, the silver powder can be loaded into a Henschel mixer (FM Mixer produced by Mitsui Mining Co., Ltd.; model: FM75; SO stirring blade used), the lubricant can be added thereto, and then stirring can be performed to mix the first silver powder and the lubricant. The silver powder may be in a suitably aggregated state even after the lubricant mixing step. In the flaking step, first silver particles in the first silver powder that has been mixed with the lubricant are flattened through collisions with the media inside of the vessel, and a second silver powder that is an assembly of second silver particles coated with the lubricant is obtained. This second silver powder is, more specifically, the silver powder according to the present embodiment.

Examples of the lubricant include fatty acids such as stearic acid, palmitic acid, linoleic acid, linolenic acid, and oleic acid. Of these examples, unsaturated fatty acids such as linoleic acid, linolenic acid, and oleic acid, in particular, are particularly preferable.

The second silver powder obtained as the silver powder according to the present embodiment has a diameter at a cumulative value of 50% of not less than 3 μm and not more than 4 μm and a ratio of particles of 10 μm or larger of 10% or less in a volume-based particle size distribution measured using a laser diffraction/scattering particle size distribution measurement instrument as previously described. Moreover, with regards to particle shape observed by image analysis based on an SEM image, the second silver powder includes flake-like particles having a major axis of 6 μm or more and irregularly shaped particles having a major axis of less than 6 μm. Furthermore, an average aspect ratio that is a ratio of the average major axis of the flake-like particles relative to the average thickness of the flake-like particles is 8 or more.

Also, a shape factor that is a ratio of the area of a circle having the average maximum length of the irregularly shaped particles as a diameter relative to the average particle area of the irregularly shaped particles is not less than 1.7 and not more than 1.9. The ignition loss of the second silver powder is not less than 0.1 wt % and not more than 0.4 wt %.

Also note that with regards to particle shape observed by image analysis based on an SEM image of the second silver powder, the number of flake-like particles having a major axis that is not less than 4 times the specific surface area diameter of the first silver powder (lubricant-mixed silver powder) is not less than 1% and not more than 13% of the total number of particles serving as subjects in the image analysis. In other words, in the method of producing a silver powder according to the present embodiment, the specific surface area diameter of the first silver powder is controlled such that a correspondence relationship of parameters relating to particle physical properties of the second silver powder and the first silver powder is the relationship set forth above.

In the method of producing a silver powder according to the present embodiment, the second silver powder is expected to be obtained through a comparatively small number of collisions between the media and particles in the flaking step that is performed with respect to the first silver powder that is in a suitably aggregated state after mixing with the lubricant (i.e., the lubricant-mixed silver powder). The first silver powder controlled such as to have a diameter at a cumulative value of 50% of not less than 1.5 times and not more than 3 times the specific surface area diameter after mixing with the lubricant is controlled such that through the flaking step, the first silver powder becomes a mixed powder that includes flake-like particles having a major axis of not less than 4 times the specific surface area diameter while also including many irregularly shaped particles that maintain a major axis of less than 4 times the specific surface area diameter when particles in the second powder are observed in an SEM image. For this reason, production is preferably performed such that in the mixed powder, the number proportion of flake-like particles having a major axis of not less than 4 times the specific surface area diameter is not less than 1% and not more than 13%, and is more preferably performed such that this number proportion is not less than 3% and not more than 12%.

As one example, a so-called "media mill" such as a ball mill or a bead mill may be repurposed and used in the flaking step. In other words, flattening of the first silver powder can be performed by stirring the first silver powder and the lubricant with media of the media mill inside of the media mill to a degree that does not cause milling of the first silver powder to progress but that does impart plastic deformation to the first silver powder. Stirring in the media mill may be performed through rotation of a vessel or a stirring paddle or may be performed through vibration of a vessel.

The additive amount of the lubricant in the flaking step is set such that the additive amount of the lubricant added in the flaking step and the additive amount of the surface treatment agent that has already been added in the surface treatment agent addition step are, in total, not less than 0.1 wt % and not more than 0.4 wt % relative to the weight of silver in the first silver powder. Moreover, the additive amount of the lubricant may be set such that the additive amount of the lubricant that is added in the flaking step and the attached amount on the first powder of the surface treatment agent that has already been added in the surface treatment agent addition step (i.e., the amount of surface treatment agent in the first silver powder determined through measurement of the amount of carbon using a carbon/sulfur analyzer as previously described) are, in total (also referred to as the amount of all fatty acid), preferably not less than 0.1 wt % and not more than 0.4 wt %, and more preferably not less than 0.14 wt % and not more than 0.30 wt % relative to the weight of silver in the first silver powder. The additive amount of the lubricant is preferably not less than 0.05 wt % and not more than 0.3 wt % relative to the weight of the first silver powder. The additive amount of the lubricant can be converted to an additive amount of the lubricant relative to the weight of silver in the first silver powder by regarding a weight determined by subtracting the attached amount of the surface treatment agent from the weight of the first silver powder as the weight of silver.

The method of producing a silver powder according to the present embodiment may include steps other than the steps described above as necessary.

The following describes examples of the silver powder according to the present embodiment.

Example 1

A first silver powder according to this example was prepared as follows.

(Reduction Step)

First, 167.1 kg of 26 wt % ammonia aqueous solution was added to 2,922 kg of silver nitrate aqueous solution containing 68.8 kg of silver as a silver ion aqueous solution so as to produce a silver ammine complex aqueous solution. In addition, 266 kg of 6 wt % hydrazine aqueous solution as a reductant was added to this silver ammine complex aqueous solution to obtain a first liquid. The addition rate of the reductant was set as 80 L/min.

(Surface Treatment Agent Addition Step)

Once 5 minutes had passed from the end point of addition of the reductant, 68.8 g of oleic acid (0.1 wt % relative to the weight of silver contained in the silver ammine complex aqueous solution (calculated by 68.8 g of oleic acid/68,000 g of silver×100)) was added as a surface treatment agent. After addition of the surface treatment agent, 5 minutes of stirring was performed to yield a second liquid. The second liquid was in the form of a slurry containing first silver particles.

(Separation Step)

Filtration, water washing, and subsequent drying were performed with respect to the second liquid to obtain a first silver powder. An SEM image of this first silver powder is presented in FIG. 1. The first silver powder according to Example 1 is in a state in which uniform silver particles are aggregated.

(Lubricant Mixing Step)

After loading 16.25 kg of the first silver powder into a Henschel mixer (FM Mixer produced by Mitsui Mining Co., Ltd.; model: FM75; SO stirring blade used) and performing 1 minute of stirring thereof at 900 rpm, 37.4 g of oleic acid (0.23 wt % relative to the weight of the first silver powder (calculated by 37.4 g of oleic acid/16,250 g of first silver powder×100)) was added as a lubricant, and was mixed and stirred therewith for 20 minutes at a stirring blade rotation speed of 2,200 rpm. This step was performed for a plurality of batches to yield a lubricant-mixed silver powder having the lubricant dispersed on the surfaces of silver particles. Note that the amount of oleic acid as the lubricant was also 0.23 wt % relative to the weight of silver.

(Flaking Step)

A vibratory mill (model FVR-20 produced by Chuo Kakohki Co., Ltd.) was charged with 32 kg of the lubricant-mixed silver powder and 256 kg of SUS balls (diameter: 1.6 mm) and was used to perform 135 minutes of treatment with a vibration frequency of 780 vpm as flaking treatment so as to cause flaking of the lubricant-mixed silver powder and obtain a second silver powder.

Figure 2:
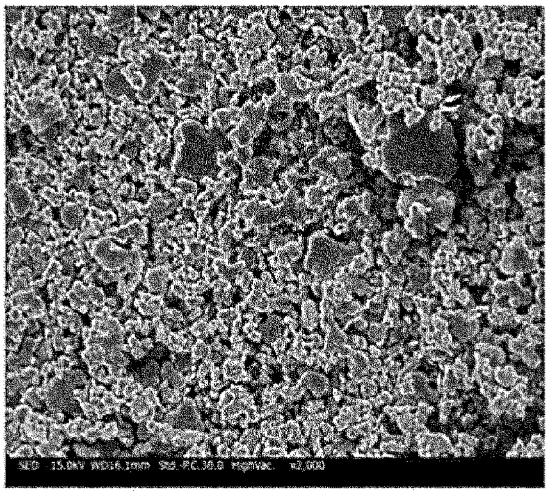
FIG. 2 is an SEM image (×2,000) of a silver powder according to Example 1.
Figure 3:
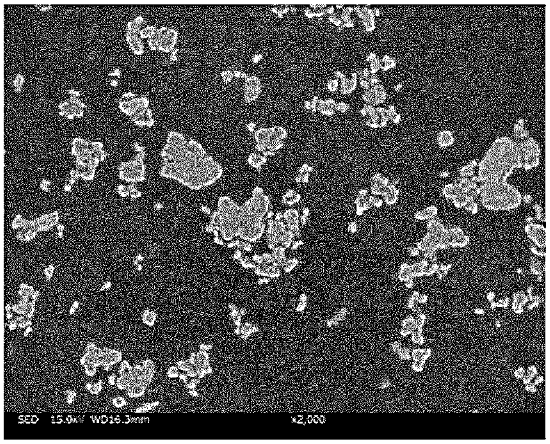
FIG. 3 is an SEM image (×2,000) of the silver powder according to Example 1.

The second silver powder was separated from the SUS balls and was then stirred at 2,600 rpm for 25 minutes in the above-described Henschel mixer to cause disintegration. In addition, the second silver powder that had undergone disintegration was sifted using a dry sifting machine (produced by Freund-Turbo Corporation; model TS125×200/27 μm opening size screen) so as to remove coarse particles and thereby obtain a silver powder (sifted second silver powder) according to Example 1. SEM images of the silver powder according to Example 1 are presented in FIGS. 2 and 3. Note that the SEM image in FIG. 3 is an SEM image for use in image analysis that was recorded after the silver powder had been dispersed compared to the SEM image in FIG. 2.

Example 2

Figure 4:
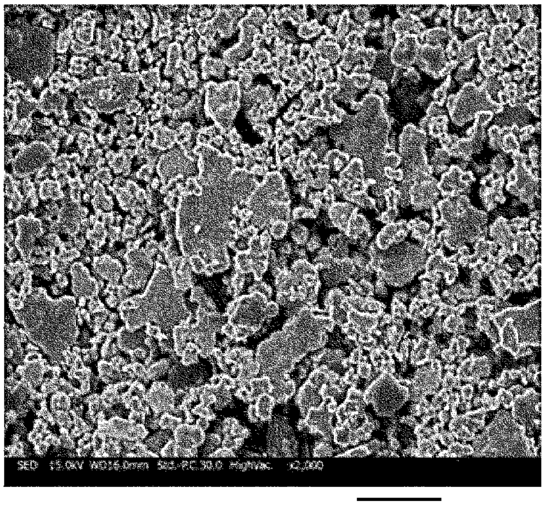
FIG. 4 is an SEM image (×2,000) of a silver powder according to Example 2.
Figure 5:
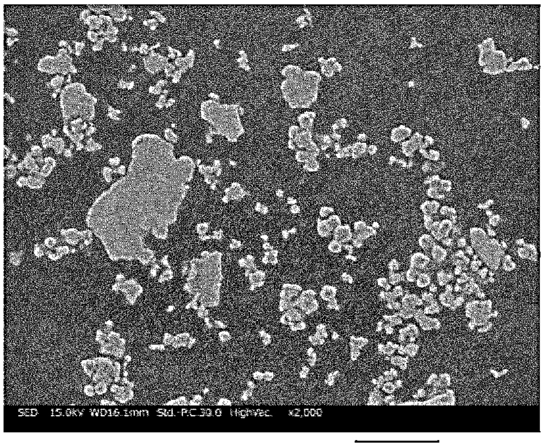
FIG. 5 is an SEM image (×2,000) of the silver powder according to Example 2.

A silver powder according to Example 2 was obtained in the same way as in Example 1 with the exception that the additive amount of the lubricant in the flaking step of Example 1 was changed to 24.4 g (0.15 wt % relative to the weight of the first silver powder). SEM images of the silver powder according to Example 2 are presented in FIGS. 4 and 5. Note that the SEM image in FIG. 5 is an SEM image for use in image analysis that was recorded after the silver powder had been dispersed compared to the SEM image in FIG. 4.

Example 3

Figure 6:
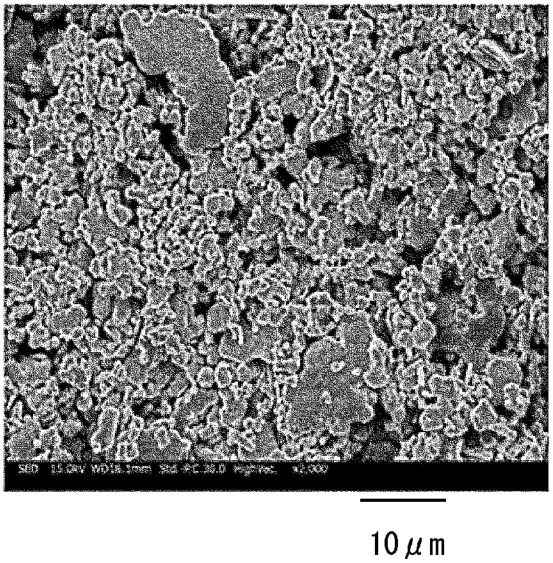
FIG. 6 is an SEM image (×2,000) of a silver powder according to Example 3.
Figure 7:
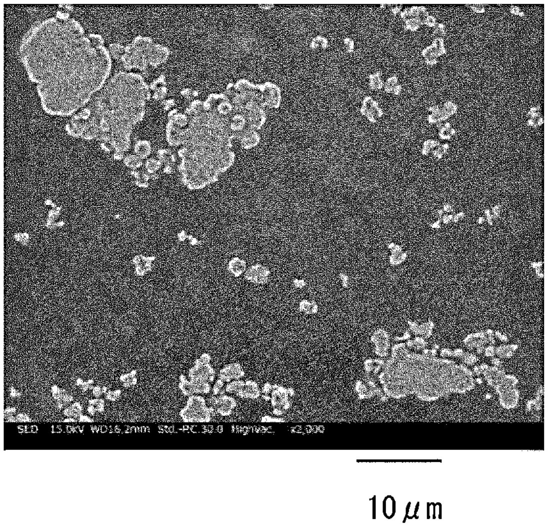
FIG. 7 is an SEM image (×2,000) of the silver powder according to Example 3.

A silver powder according to Example 3 was obtained in the same way as in Example 1 with the exception that the additive amount of the lubricant in the flaking step of Example 1 was changed to 13.0 g (0.08 wt % relative to the weight of the first silver powder). SEM images of the silver powder according to Example 3 are presented in FIGS. 6 and 7. Note that the SEM image in FIG. 7 is an SEM image for use in image analysis that was recorded after the silver powder had been dispersed compared to the SEM image in FIG. 6.

Comparative Example 1

Figure 8:
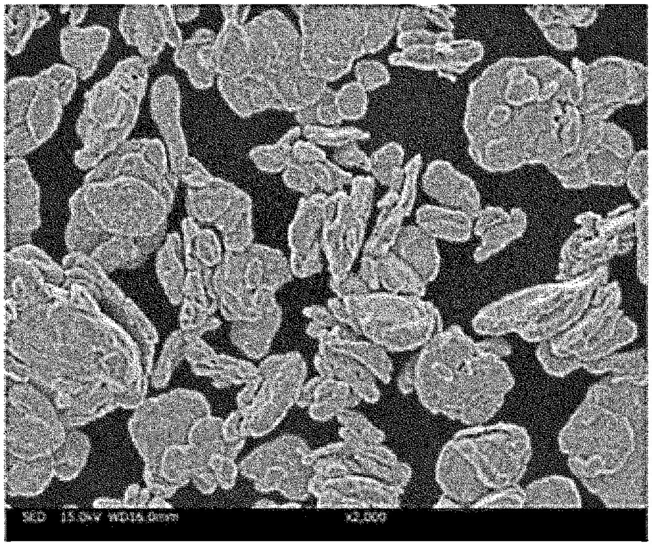
FIG. 8 is an SEM image (×2,000) of a silver powder according to Comparative Example 1.

A silver powder according to Comparative Example 1 was obtained in the same way as in Example 1 with the exception that the disintegration step and the flaking step of Example 1 were changed as described below. An SEM image of the silver powder according to Comparative Example 1 is presented in FIG. 8.

In this comparative example, 0.12 kg of the first silver powder was weighed out and was subjected to 3 minutes of disintegration in a sample mill (SK-M10 produced by Kyoritsu Riko). This was repeated for 13 batches to yield 1.5 kg of the first silver powder that had undergone disintegration. In addition, the total amount of the first silver powder that had undergone disintegration and 12 kg of SUS balls (diameter: 1.6 mm) were loaded into a vibratory mill (model B-1 produced by Chuo Kakohki Co., Ltd.) without addition of a lubricant, and 120 minutes of treatment was performed at a vibration frequency of 1,200 vpm. Thereafter, 3 minutes of disintegration treatment was performed in the above-described sample mill, and then coarse particles were removed using a sieve having an opening size of 25 μm to yield a silver powder according to Comparative Example 1.

Comparative Example 2

Figure 9:
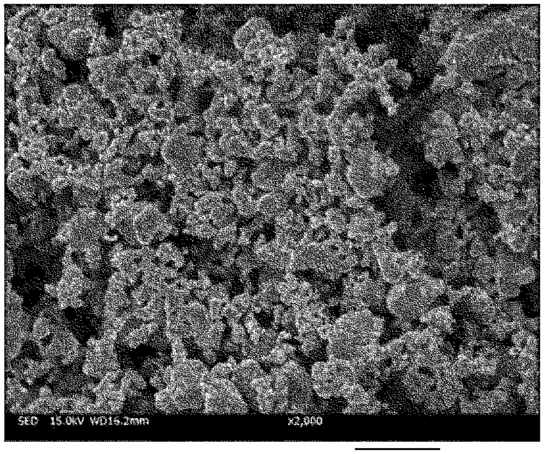
FIG. 9 is an SEM image (×2,000) of a silver powder after 10 hours of heat treatment in Comparative Example 2.
Figure 10:
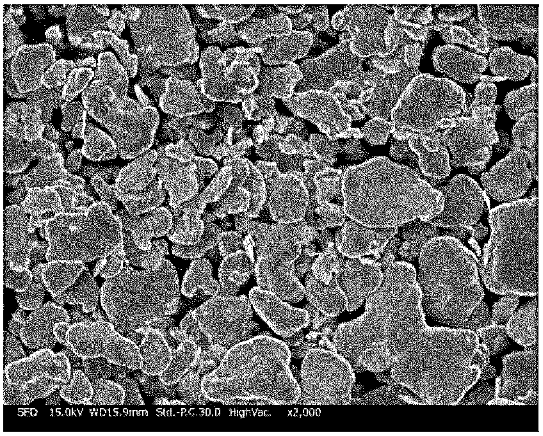
FIG. 10 is an SEM image (×2,000) of a silver powder according to Comparative Example 2.
Figure 11:
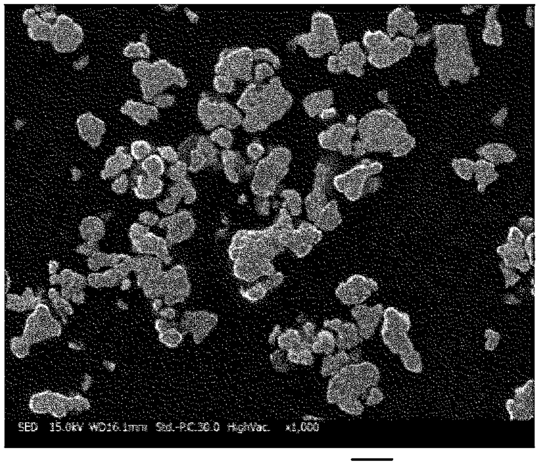
FIG. 11 is an SEM image (×1,000) of the silver powder according to Comparative Example 2.

A first silver powder of Comparative Example 2 was obtained by, without adding a surface treatment agent in the surface treatment agent addition step of Example 1, performing filtration, water washing, and drying with respect to the second liquid, and then performing 10 hours of heat treatment at 150° C. so as to promote aggregation of particles. Moreover, a silver powder according to Comparative Example 2 was then obtained in the same way as in Example 1 with the exception that the lubricant added in the flaking step was set as 48.8 g (0.30 wt % relative to the weight of silver powder subjected to the flaking step). An SEM image of the silver powder after 10 hours of heat treatment is presented in FIG. 9. SEM images of the silver powder according to Comparative Example 2 are presented in FIGS. 10 and 11. Note that the SEM image in FIG. 11 is an SEM image for use in image analysis that was recorded after the silver powder had been dispersed compared to the SEM image in FIG. 10.

Comparative Example 3

A silver ammine complex aqueous solution was produced by adding 122.1 kg of 26.28 wt % ammonia aqueous solution to 2,411 kg of silver nitrate aqueous solution containing 64.8 kg of silver. In addition, 6 kg of 31.15 wt % sodium hydroxide aqueous solution was added to the produced silver ammine complex aqueous solution, and then 158.4 kg of 37 wt % formalin aqueous solution was added as a reductant.

Figure 12:
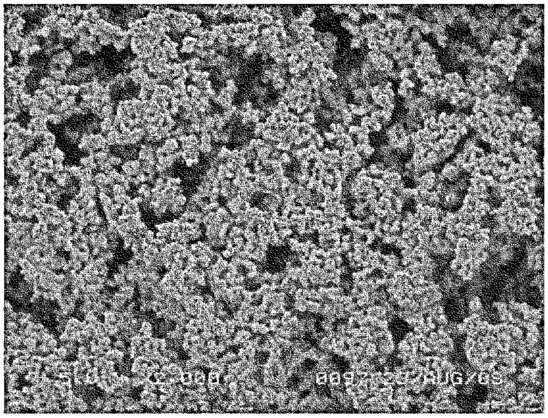
FIG. 12 is an SEM image (×2,000) of a silver powder after drying in Comparative Example 3.

Once addition of the reductant was complete, 360 g (0.56 wt % (0.09 wt % in terms of amount of stearic acid) relative to the weight of silver contained in the silver ammine complex aqueous solution) of Selosol 920 (produced by Chukyo Yushi Co., Ltd.; containing 15.5 wt % of stearic acid) was added as a surface treatment agent so as to produce a slurry containing silver powder. Filtration, water washing, and subsequent drying were performed with respect to the obtained slurry to yield a silver powder (hereinafter, also referred to as a dry silver powder). An SEM image of this silver powder is presented in FIG. 12.

The silver powder was measured out in an amount of 32.2 kg and was loaded into the same Henschel mixer as in Example 1. The silver powder was stirred at a stirring blade rotation speed of 1,200 rpm for 1 minute to cause disintegration, and then 64.4 g of stearic acid (0.2 wt % relative to the weight of the silver powder) was added as a lubricant and was further stirred therewith at a stirring blade rotation speed of 1,200 rpm for 20 minutes. This yielded a lubricant-mixed silver powder having the lubricant dispersed on the surfaces of silver particles.

The same vibratory mill as in Example 1 was charged with 32 kg of the lubricant-mixed silver powder and 256 kg of SUS balls (diameter: 1.6 mm) and was used to perform 60 minutes of treatment at a vibration frequency of 1,442 vpm as flaking treatment.

Figure 13:
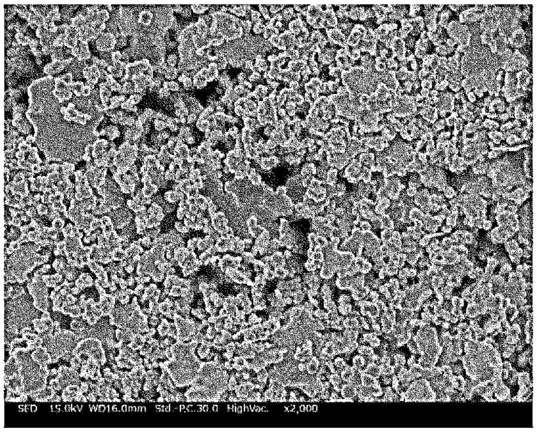
FIG. 13 is an SEM image (×2,000) of a silver powder according to Comparative Example 3.
Figure 14:
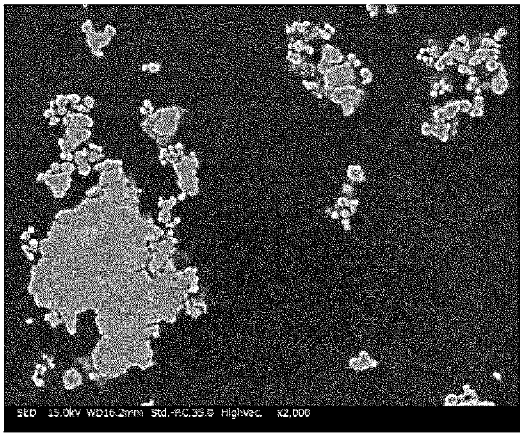
FIG. 14 is an SEM image (×2,000) of the silver powder according to Comparative Example 3.

Thereafter, the silver powder that had undergone disintegration was sifted using the same dry sifting machine (27 μm opening size screen) as in Example 1 so as to remove coarse particles and thereby obtain a silver powder according to Comparative Example 3. SEM images of the silver powder according to Comparative Example 3 are presented in FIGS. 13 and 14. Note that the SEM image in FIG. 14 is an SEM image for use in image analysis that was recorded after the silver powder had been dispersed compared to the SEM image in FIG. 10.

Comparative Example 4

A dry silver powder was obtained in the same way as in Comparative Example 3 and then this silver powder was subjected to 10 hours of heat treatment at 200° C. so as to promote aggregation of particles and yield a silver powder from which the surface treatment agent had been volatilized (hereinafter, also referred to as a heat treated silver powder).

This silver powder (heat treated silver powder) was measured out in an amount of 16.4 kg and was loaded into the same Henschel mixer as in Example 1. The silver powder was stirred at a stirring blade rotation speed of 900 rpm for 1 minute to cause disintegration, and then 11.5 g of oleic acid (0.07 wt % relative to the weight of the silver powder) was added as a lubricant and was further stirred therewith at a stirring blade rotation speed of 2,600 rpm for 15 minutes. This step was performed for a plurality of batches to yield a lubricant-mixed silver powder having the lubricant dispersed on surfaces of silver particles. Treatment until the lubricant-mixed silver powder was obtained was performed for 2 batches.

The same vibratory mill as in Example 1 was charged with 32 kg of the lubricant-mixed silver powder and 256 kg of SUS balls (diameter: 1.6 mm) and was used to perform 90 minutes of treatment at a vibration frequency of 1,200 vpm as flaking treatment.

Figure 15:
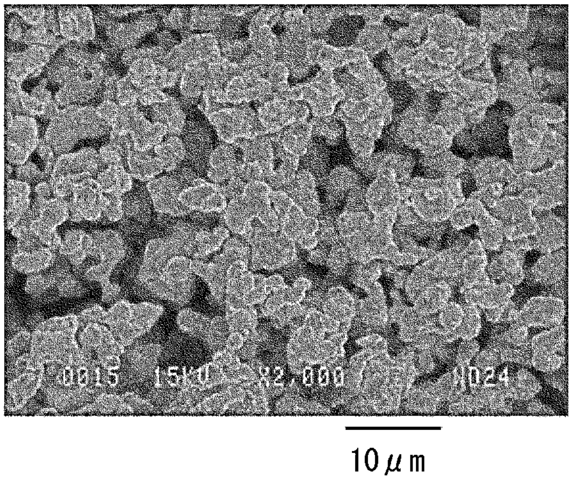
FIG. 15 is an SEM image (×2,000) of a silver powder after heat treatment in Comparative Example 4.
Figure 16:
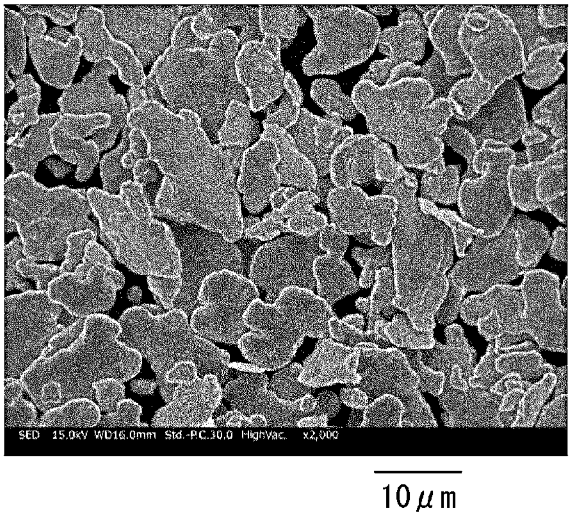
FIG. 16 is an SEM image (×2,000) of a silver powder according to Comparative Example 4.

The silver powder that had undergone flaking was separated from the SUS balls and was then stirred in the above-described Henschel mixer at 2,600 rpm for 20 minutes to cause disintegration. In addition, the silver powder that had undergone disintegration was sifted using the same dry sifting machine (24 μm opening size screen) as in Example 1 so as to remove coarse particles and thereby obtain a silver powder according to Comparative Example 4. An SEM image of the silver powder after 10 hours of heat treatment is presented in FIG. 15. An SEM image of the silver powder according to Comparative Example 4 is presented in FIG. 16.

Production conditions, etc. for the silver powders according to the above-described examples and comparative examples are outlined in Table 1.

TABLE 1

| | Example 1 | Example 2 | Example 3 | Comparative Example 1 | Comparative Example 2 | Comparative Example 3 | Comparative Example 4 |
|---|---|---|---|---|---|---|---|
| Fatty acid contained in surface treatment agent and additive amount thereof | Oleic acid 0.1 wt % | Oleic acid 0.1 wt % | Oleic acid 0.1 wt % | Oleic acid 0.1 wt % | None | Stearic acid 0.09 wt % | Stearic acid 0.09 wt % |
| Heat treatment | None | None | None | None | 150° C./ 10 hours | None | 200° C./ 10 hours |
| Lubricant and additive amount thereof | Oleic acid 0.23 wt % | Oleic acid 0.15 wt % | Oleic acid 0.08 wt % | None | Oleic acid 0.3 wt % | Stearic acid 0.2 wt % | Oleic acid 0.07 wt % |
| Total additive amount of surface treatment agent and lubricant (wt %) | 0.33 | 0.25 | 0.18 | 0.1 | 0.3 | 0.29 | 0.16 |

Evaluation results are shown in Table 2 for the lubricant-mixed silver powders after lubricant addition serving as first silver powders according to the examples, for the disintegrated silver powder without lubricant addition/mixing according to Comparative Example 1, and for the lubricant-mixed silver powders after lubricant addition according to Comparative Examples 2 to 4.

The attached amount of surface treatment agent in Table 2 is the residual amount of the surface treatment agent in the silver powder (i.e., the attached amount of the surface treatment agent in the first silver powder) and is a value that is determined by, in a state in which the type of surface treatment agent has been identified, using a carbon/sulfur analyzer (TG8120 produced by Horiba, Ltd.) to measure the amount of carbon as previously described. The attached amount of surface treatment agent in Table 2 is indicated as a ratio (wt %) of the weight of the surface treatment agent relative to the weight of silver. Note that this measurement is not performed for Comparative Examples 2 and 4 in which heat treatment is performed because the majority of the surface treatment agent is volatilized in accompaniment to the heat treatment.

Also note that the specific surface area and specific surface area diameter in Table 2 are those with respect to the lubricant-mixed silver powder (disintegrated silver powder without lubricant addition/mixing in Comparative Example 1). The specific surface area was measured using a Macsorb HM-model 1210 produced by Mountech Co., Ltd. as previously described, and the specific surface area diameter was calculated as previously described.

The amount of all fatty acid in Table 2 refers to the amount of all fatty acid in the lubricant-mixed silver powder (total of additive amount of lubricant and attached amount of surface treatment agent in lubricant-mixed silver powder subjected to flaking step) and is indicated as a ratio (wt %) of the weight of all fatty acid relative to the weight of silver in the lubricant-mixed silver powder. The amount of all fatty acid can be taken to be a value corresponding to the total of the attached amount (wt %) of the surface treatment agent and the additive amount (wt %) of the lubricant indicated in Table 1. Alternatively, the amount of all fatty acid may be taken to be a value that is determined by using the above-described carbon/sulfur analyzer to measure the amount of carbon with respect to the lubricant-mixed silver powder after lubricant addition.

Values for volume-based particle size distributions in Table 2 are values with respect to the lubricant-mixed silver powder after lubricant addition with the exception of Comparative Example 1. In the case of Comparative Example 1 in which a lubricant is not added, these are values with respect to the disintegrated silver powder without lubricant addition/mixing. A laser diffraction particle size distribution measurement instrument (Microtrac particle size distribution measurement instrument MT-3300EXII produced by MicrotracBEL Corp.) was used to measure a particle size distribution and to calculate volume-based values for the diameter (D10) at a cumulative value of 10%, the diameter (D50) at a cumulative value of 50%, the diameter (D90) at a cumulative value of 90%, and the ratio (%) of particles having a particle diameter of 10 μm or larger as previously described. In Table 2, a value determined by subtracting the diameter at a cumulative value of 10% from the diameter at a cumulative value of 90% and then dividing the resulting difference by the diameter at a cumulative value of 50%, which serves as a value indicating span of the volume-based particle size distribution, is denoted as "(D90−D10)/D50". Moreover, "D50/Specific surface area diameter" in Table 2 is a value determined by dividing D50 of the lubricant-mixed silver powder by the specific surface area diameter of the lubricant-mixed silver powder with the exception of Comparative Example 1. This value makes it possible to determine the state of aggregation of silver particles prior to collisions with the media in the vessel of the tumbling ball mill in the flaking step. In the case of Comparative Example 1 in which a lubricant is not used, this value is a value determined by dividing D50 of the disintegrated silver powder without lubricant mixing by the specific surface area diameter of the disintegrated silver powder without lubricant mixing.

TABLE 2

| | Example 1 | Example 2 | Example 3 | Comparative Example 1 | Comparative Example 2 | Comparative Example 3 | Comparative Example 4 |
|---|---|---|---|---|---|---|---|
| Attached amount of surface treatment agent | Oleic acid 0.07 wt % | Oleic acid 0.07 wt % | Oleic acid 0.07 wt % | Oleic acid 0.07 wt % | — | Stearic acid 0.06 wt % | — |
| Specific surface area ($m^2/g$) | 0.37 | 0.37 | 0.37 | 0.37 | 0.23 | 0.43 | 0.18 |
| Specific surface area diameter (μm) | 1.54 | 1.54 | 1.54 | 1.54 | 2.48 | 1.33 | 3.17 |
| Amount of all fatty acid (wt %) | 0.30 | 0.22 | 0.15 | 0.07 | 0.30 | 0.26 | 0.07 |
| D10 (μm) | 1.3 | 1.4 | 1.4 | 1.7 | 1.8 | 2.2 | 3.3 |
| D50 (μm) | 3.3 | 3.3 | 3.3 | 4.1 | 4.7 | 4.4 | 7.5 |
| D90 (μm) | 8.8 | 7.8 | 7.5 | 9.3 | 10.8 | 10.0 | 15.7 |
| (D90-D10)/D50 | 2.3 | 1.9 | 1.8 | 1.9 | 1.9 | 1.8 | 1.7 |
| 10 μm or larger (%) | 6.6 | 6.4 | 5.6 | 7.0 | 12.2 | 10.1 | 35.8 |
| D50/Specific surface area diameter | 2.1 | 2.1 | 2.1 | 2.7 | 1.9 | 3.3 | 2.4 |

Evaluation results are shown in Table 3 for silver powders according to the examples and silver powders according to the comparative examples after the flaking step. A silver powder is denoted as "Mixed powder" in Table 3 in a case in which flake-like particles and irregularly shaped particles can be observed by SEM observation and in which at least half of the particles are irregularly shaped particles, whereas a silver powder is denoted as "Flakes" in Table 3 in a case in which the proportion constituted by flake-like particles is at least half of the observed particles. Measurements of ignition loss (Ig-Loss), volume-based particle size distribution values, specific surface area, and tap density of the silver powders were performed as previously described.

TABLE 3

| | Example 1 | Example 2 | Example 3 | Comparative Example 1 | Comparative Example 2 | Comparative Example 3 | Comparative Example 4 |
|---|---|---|---|---|---|---|---|
| Ig-Loss (wt %) | 0.33 | 0.23 | 0.17 | 0.09 | 0.32 | 0.85 | 0.09 |
| D10 (μm) | 1.3 | 1.4 | 1.4 | 3.4 | 2.3 | 1.9 | 4.5 |
| D50 (μm) | 3.0 | 3.3 | 3.4 | 7.4 | 5.8 | 4.5 | 9.5 |
| D90 (μm) | 7.7 | 8.8 | 9.2 | 14 | 13.2 | 12.0 | 18.6 |
| (D90-D10)/D50 | 2.1 | 2.2 | 2.3 | 1.4 | 1.9 | 2.3 | 1.5 |
| 10 μm or larger (%) | 5.0 | 7.6 | 8.3 | 33.1 | 20.5 | 14.3 | 52.9 |
| Flakes or mixed powder | Mixed powder | Mixed powder | Mixed powder | Flakes | Flakes | Mixed powder | Flakes |
| Specific surface area ($m^2/g$) | 0.39 | 0.39 | 0.39 | 0.20 | 0.25 | 0.50 | 0.29 |
| Tap density (g/mL) | 4.5 | 5.0 | 5.9 | — | 5.5 | 4.3 | 4.8 |

In the case of a mixed powder such as described above, the following evaluations of irregularly shaped particles and flake-like particles were performed. Image analysis-type particle size distribution measurement software (Mac-View produced by Mountech Co., Ltd.) was used to perform measurement of the outer shape of each of 400 or more particles, in total, and to extract data for particles having a major axis of less than 6 μm as data for irregularly shaped particles. Evaluation results are shown in Table 4 for irregularly shaped particles in the silver powders according to the examples and irregularly shaped particles in the silver powder according to Comparative Example 3. "Major axis/Minor axis" in Table 4 is a value determined by dividing the average major axis of the irregularly shaped particles by the average minor axis of the irregularly shaped particles.

TABLE 4

| | Example 1 | Example 2 | Example 3 | Comparative Example 1 | Comparative Example 2 | Comparative Example 3 | Comparative Example 4 |
|---|---|---|---|---|---|---|---|
| Shape factor | 1.78 | 1.87 | 1.85 | — | — | 1.86 | — |
| Major axis/ Minor axis | 1.44 | 1.50 | 1.51 | — | — | 1.47 | — |
| Average circularity | 0.566 | 0.557 | 0.557 | — | — | 0.533 | — |

Image analysis-type particle size distribution measurement software (Mac-View produced by Mountech Co., Ltd.) was used to perform measurement of the outer shape of each of 400 or more particles, in total, and to extract data for particles having a major axis of 6 μm or more as data for flake-like particles. Evaluation results are shown in Table 5 for flake-like particles in the silver powders according to the examples and flake-like particles in the silver powder according to Comparative Example 3. "Major axis/Minor axis" in Table 5 is a value determined by dividing the average major axis of the flake-like particles by the average minor axis of the flake-like particles. "Number proportion of flake-like particles (%)" in Table 5 is the number of flake-like particles as a proportion relative to the total number of silver particles serving as subjects in image analysis and is a value that is determined by dividing the number of flake-like particles by the total number. Moreover, "Number proportion of flake-like particles having major axis of not less than 4 times specific surface area diameter (%)" is the number of flake-like particles having a major axis that is not less than 4 times the specific surface area diameter of the first silver powder (lubricant-mixed silver powder) indicated in Table 2 as a proportion relative to the total number of silver particles serving as subjects in image analysis and is a value that is determined by dividing the number of these flake-like particles by the total number.

TABLE 5

| | Example 1 | Example 2 | Example 3 | Comparative Example 1 | Comparative Example 2 | Comparative Example 3 | Comparative Example 4 |
|---|---|---|---|---|---|---|---|
| Shape factor | 1.86 | 2.06 | 1.94 | — | — | 2.06 | — |
| Major axis/ Minor axis | 1.50 | 1.62 | 1.55 | — | — | 1.58 | — |
| Average circularity | 0.52 | 0.52 | 0.53 | — | — | 0.49 | — |
| Average major axis | 10.04 | 9.25 | 9.04 | — | — | 10.56 | — |
| Average thickness | 0.973 | 0.969 | 0.997 | — | — | 0.932 | — |
| Average aspect ratio | 10.3 | 9.5 | 9.1 | — | — | 11.3 | — |
| Number proportion of flake-like particles (%) | 5.1 | 8.1 | 11.5 | — | — | 9.2 | — |
| Number proportion of flake-like particles having major axis not less than 4 times specific surface area diameter (%) | 4.8 | 8.1 | 10.7 | — | — | 14.2 | — |

In addition, the silver powders according to the examples and comparative examples were used to produce conductive pastes, and these conductive pastes according to the examples and comparative examples were evaluated.

Figure 17:
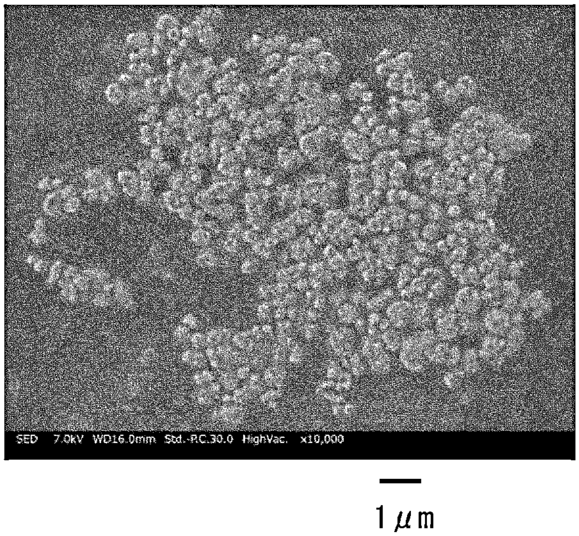
FIG. 17 is an SEM image (×10,000) of a spherical silver powder.

Note that production of a conductive paste was performed as follows. First, the silver powder according to each example or comparative example and a spherical silver powder (silver powder containing spherical silver particles; AG-2-1CAP produced by DOWA HIGHTECH CO., LTD.; also referred to as "AG-2-1C Agent Added") were mixed such as to have a weight ratio of 6:4 to prepare a feedstock silver powder. The spherical silver powder had a D50 of 0.80 μm and was determined to have an average shape factor of 1.53, an average aspect ratio of 1.3, and an average Heywood diameter of 0.34 μm when image analysis-type particle size distribution measurement software (Mac-View produced by Mountech Co., Ltd.) was used to measure the outer shape of each of 400 or more particles, in total. An SEM image (×10,000) of the spherical silver powder is presented in FIG. 17.

Epoxy resin jER 1009 (produced by Mitsubishi Chemical Corporation) was added to butyl carbitol acetate (hereinafter, denoted as BCA) solvent and was heated under stirring until completely dissolved to obtain an epoxy resin jER 1009 vehicle. The concentration of jER 1009 in the vehicle was 62.23 wt %.

Mixing and kneading were performed with respect to 94.20 wt % of the feedstock silver powder, 3.97 wt % of epoxy resin EP-4901E (produced by Adeka Corporation), 1.59 wt % of the epoxy resin jER 1009 vehicle, 0.25 wt % of boron trifluoride monoethylamine complex curing agent, and an appropriate amount of BCA solvent.

The mixing and kneading were performed by first using a propeller-less planetary stirring and defoaming device (VMX-N360 produced by EME, Inc.) to perform 30 seconds of stirring and mixing with a revolution speed of 1,200 rpm and a rotation speed of 600 rpm, and subsequently using a three-roll mill (EXAKT 80S produced by Otto Hermann) to knead the mixture.

After the mixing and kneading, BCA was added such as to give the following composition and yield a pre-viscosity adjustment conductive paste.

Feedstock silver powder: 91.60 wt %

Epoxy resin EP-4901E: 3.84 wt %

Epoxy resin jER 1009: 0.96 wt %

Boron trifluoride monoethylamine complex curing agent: 0.24 wt %

BCA solvent: 3.36 wt %

The viscosity of the pre-viscosity adjustment conductive paste is shown in Table 6.

TABLE 6

| | Example 1 | Example 2 | Example 3 | Comparative Example 1 | Comparative Example 2 | Comparative Example 3 | Comparative Example 4 |
|---|---|---|---|---|---|---|---|
| Viscosity (at 1 rpm) (Pa · s) | 278 | 258 | 234 | 179 | 262 | 456 | 210 |
| Wire aspect ratio (film thickness/ line width) | 0.22 | 0.19 | 0.20 | 0.13 | 0.17 | 0.14 | 0.16 |
| Disconnection rate (%) | 0 | 0 | 0 | 0 | 0 | 100 | 44 |
| Wire cross-sectional area ($\mu m^2$) | 199 | 173 | 173 | 138 | 165 | 36 | 132 |
| Line resistance (Ω) | 43.5 | 43.5 | 46.0 | 62.0 | 51.7 | Disconnection | 67.4 |

In addition, BCA was added as appropriate to the pre-viscosity adjustment conductive paste in each example or comparative example so as to obtain a viscosity adjusted conductive paste that was adjusted to a viscosity of approximately 200 Pa-s. The viscosity of the viscosity adjusted conductive paste and the silver concentration after viscosity adjustment are shown in Table 7.

TABLE 7

| | Example 1 | Example 2 | Example 3 | Comparative Example 1 | Comparative Example 2 | Comparative Example 3 | Comparative Example 4 |
|---|---|---|---|---|---|---|---|
| Silver concentration after viscosity adjustment (wt %) | 90.9 | 90.9 | 91.1 | 91.8 | 91.2 | 90.5 | 91.6 |
| Viscosity (at 1 rpm) (Pa · s) | 206 | 210 | 206 | 191 | 198 | 202 | 210 |
| Disconnection rate (%) | 0 | 0 | 0 | 0 | 0 | 33.3 | 44 |
| Line resistance (Ω) | 42.8 | 39.3 | 42.3 | 58.0 | 44.6 | 81.5 | 67.4 |

Moreover, formation of a conductive film and subsequent evaluation of disconnection rate and line resistance were performed using the pre-viscosity adjustment conductive paste and the viscosity adjusted conductive paste. Formation of a conductive film was performed by applying the conductive paste in a line shape, subsequently drying the conductive paste at 150° C. for 10 minutes using an air circulation dryer, and then further heating the conductive paste at 200° C. for 30 minutes to cause curing and obtain a line-shaped conductive film (wire). Nine line patterns having a line width (design width) of 25 μm were produced as evaluation subjects for disconnection rate and line resistance. In the case of the pre-viscosity adjustment conductive paste, the wire aspect ratio and wire cross-sectional area were also evaluated. Results of these evaluations for the pre-viscosity adjustment conductive paste are also shown in Table 6. The line resistance value is taken to be an average value for the 9 line patterns (excluding those regarded as disconnected as described further below) by measuring a resistance value of each wire using a digital multimeter (R6551 produced by Advantest Corporation). The value of the wire aspect ratio is taken to be an average value of a value of film thickness/line width for 3 arbitrarily selected line patterns among the 9 line patterns. Note that the film thickness and the line width are measured at a length direction central part of each of the 3 line patterns using a laser microscope (VKX-1000 produced by Keyence Corporation). The wire cross-sectional area is also taken to be an average value measured using the same device at the same location as during measurement of the film thickness and line width. Note that the disconnection rate is taken to be the number of line patterns for which disconnection is observed during line resistance measurement as a proportion relative to all 9 line patterns, given that disconnection is judged to have occurred in a case in which there is an extremely high measured value of 100 kΩ or more. Results of these evaluations for the viscosity adjusted conductive paste are also shown in Table 7.

As shown in Tables 6 and 7, the line resistance of conductive films formed by the conductive pastes in which the silver powders according to the examples are used is small compared to the line resistance of conductive films formed by the conductive pastes in which the silver powders according to the comparative examples are used. In other words, it can be seen that the silver powders according to the examples are capable of reducing the line resistance of a conductive film. It can also be seen that even when the conductive film is a thin line of 25 μm, the line is properly formed, and the wire aspect ratio and wire cross-sectional area are large.

The following observations are made in relation to features of the volume-based particle size distributions (refer to Table 3) of the silver powders (second silver powders) according to the examples. D50 is within a range of not less than 3 μm and not more than 4 μm. Moreover, the ratio of particles of 10 μm or larger is 10% or less. In contrast, the silver powders according to the comparative examples have a D50 that is more than 4 μm and a ratio of particles of 10 μm or larger that is more than 14%. In other words, the fact that the silver powders according to the examples have a suitably small D50 and a low ratio of coarse particles of 10 μm or larger is presumed to contribute to reduction of line resistance (refer to Tables 6 and 7).

Furthermore, for the silver powders according to the examples, a value of the difference determined by subtracting the diameter at a cumulative value of 10% from the diameter at a cumulative value of 90% is 2 or more and is 2.5 or less (refer to Table 3). In other words, the silver powders according to the examples have a suitably small D50 and also have a suitable particle size distribution span despite also having a low proportion of coarse particles of 10 μm or larger. This point is also presumed to contribute to reduction of line resistance. In more detail, when the silver powders according to the examples are used to print a pattern as a conductive film, unevenness of the pattern tends not to arise because the proportion of coarse particles of 10 μm or larger is small. Moreover, silver particles can be densely arranged in the pattern as a result of these silver powders having a suitably small D50 and a suitable particle size distribution span. This results in low likelihood of voids forming in the conductive film after sintering, proper formation of a conductive film line, and reduction of line resistance (refer to Tables 6 and 7). Furthermore, since silver particles can be densely arranged in the conductive film pattern, this is thought to prevent disconnection, lower the disconnection rate, and also provide excellent conductive film printability. The ability of silver particles to be densely arranged can also be determined analogously from the value of tap density (refer to Table 3). With the silver powders according to the examples, a tap density (4 g/mL) that is at least equivalent to that with the silver powders according to the comparative examples is achieved. Moreover, the fact that the wire cross-sectional area in the examples is larger than that in the comparative examples is also presumed to be a factor in reduction of line resistance. The low proportion of coarse particles of 10 μm or larger in the examples results in low likelihood of clogging arising due to the paste during screen printing and excellent ejection performance, which enables a larger wire cross-sectional area and is thought to have contributed to reduction of line resistance.

The silver powders according to the comparative examples have a high proportion of coarse particles of 10 μm or larger (refer to Table 3), which makes it likely that unevenness will arise in a conductive film pattern. Moreover, irrespective of the high proportion of particles of 10 μm or larger, dense arrangement of silver particles is thought to be difficult in a case in which a value of the difference determined by subtracting the diameter at a cumulative value of 10% from the diameter at a cumulative value of 90% is less than 2 (Comparative Examples 1, 2, 4, and 5). Consequently, it is difficult to achieve reduction of line resistance such as is observed in the examples (refer to Tables 6 and 7).

Looking in more detail, the silver powders according to the examples are each a mixed powder that includes flake-like particles and irregularly shaped particles (refer to Tables 3 to 5). The number proportion of flake-like particles is not less than 5% and not more than 12%, and the proportion of irregularly shaped particles is relatively high (refer to Table 5). The silver powders according to the examples each have an average aspect ratio of flake-like particles that is 8 or more and that is 11 or less (refer to Table 5). Moreover, the shape factor of irregularly shaped particles in the silver powders according to the examples is not less than 1.7 and not more than 1.9 (refer to Table 4). These shape features of silver particles in the silver powders are thought to contribute to reduction of line resistance in conjunction with the particle size distribution features described above. Note that based on values for the average aspect ratio of flake-like particles in the silver powders according to the examples shown in Table 5, a preferred range for the average aspect ratio of flake-like particles in the silver powder according to the present embodiment is anticipated to be 9 or more and to be 10.5 or less.

In the case of the silver powder according to Comparative Example 3, the average aspect ratio of flake-like particles therein slightly exceeds 11 (refer to Table 5). Moreover, the shape factor of irregularly shaped particles in that silver powder is not less than 1.7 and not more than 1.9. In other words, the silver powder according to Comparative Example 3 has somewhat different particle size distribution features to the silver powders according to the examples but is a mixed powder including flake-like particles and irregularly shaped particles and has similar shape features to the silver powders according to the examples, and thus it may be expected that effects similar to those of the silver powders according to the examples should be obtained with the silver powder according to Comparative Example 3. However, the silver powder according to Comparative Example 3 has an Ig-Loss value that is significantly larger than that of the silver powders according to the examples (refer to Table 3). For this reason, it is thought that voids are more likely to form during sintering and disconnection is more likely to occur (refer to Tables 6 and 7) with the silver powder according to Comparative Example 3, and that even in a case in which disconnection does not occur, line resistance will increase (refer to Table 7). With the silver powders according to the examples, the fact that the value of Ig-Loss is not less than 0.1 wt % and not more than 0.4 wt %, in addition to particle size distribution features and shape features, is thought to contribute to prevention of disconnection during sintering and reduction of line resistance. Moreover, as viewed from a viewpoint of paste viscosity, the silver powder according to Comparative Example 3 has a large Ig-Loss value and a large specific surface area, and thus tends to result in high paste viscosity. Accordingly, it is necessary to lower the silver concentration in a paste in order to adjust the paste to a specific viscosity (approximately 200 Pa·s in Table 7). In contrast, the silver powders according to the examples enable production of a paste with a high silver concentration at a specific viscosity. This is thought to make it possible to achieve prevention of disconnection during sintering and reduction of line resistance with the silver powders according to the examples.

In this manner, the silver powders according to the examples make it possible to achieve reduction of line resistance.

The following observations are made in relation to the production methods of the silver powders according to the examples. As described in each of the examples, the production methods of the silver powders according to the present examples each include: a reduction step of adding a reductant to a silver ammine complex aqueous solution to obtain a first liquid; a surface treatment agent addition step of adding a surface treatment agent to the first liquid to obtain a second liquid; a separation step of separating a first silver powder in an aggregated state from the second liquid; and a flaking step of stirring the first silver powder, a lubricant, and media inside of a vessel to obtain a second silver powder (silver powder according to each of the present examples) in which the first silver powder has undergone flattening. The inclusion of these steps in a method of producing a silver powder is thought to enable suitable production of the silver powder according to the present embodiment.

In the production methods of the silver powders according to the present examples, the first silver powder is a precursor of the silver powder according to the present embodiment. Consequently, in order to produce the silver powder according to the present embodiment, it is important to control physical properties of the first silver powder serving as a precursor.

In the production methods of the silver powders according to the present examples, controlling the specific surface area diameter of the first silver powder (lubricant-mixed silver powder) to not less than 1.3 μm and not more than 2.0 μm as shown in Table 2 is thought to be preferable for suitably producing the silver powder according to the present embodiment. The specific surface area diameter of the first silver powder (lubricant-mixed silver powder) is preferably not less than 1.4 μm and not more than 1.7 μm. Note that for each of the first silver powders according to the present examples, the value (μm) of D50 of the lubricant-mixed silver powder is not less than 1.5 times the value of the specific surface area diameter (μm) of the lubricant-mixed silver powder of the first silver powder, thus indicating that the first silver powder is in an aggregated state. It can also be seen that D50 of the lubricant-mixed silver powder of the first silver powder is preferably not more than 3 times the specific surface area diameter, and more preferably not more than 2.5 times the specific surface area diameter in view that a high proportion of flake-like particles is more likely to arise with a highly aggregated state such as in Comparative Example 1 and Comparative Examples 3 to 5.

In the production methods of the silver powders according to the present examples, the following relationship between the silver powder according to the example and the first silver powder is thought to be preferable as a relationship of particle size distribution features and shape features based on Table 3. Specifically, for the silver powders according to the present examples, it is preferable to adjust the specific surface area of the first silver powder (lubricant-mixed silver powder) such that the number of flake-like particles having a major axis of not less than 4 times the specific surface area diameter of the first silver powder (lubricant-mixed silver powder) is not less than 1% and not more than 13% of the total number of particles serving as subjects in image analysis.

Controlling the specific surface area diameter of the first silver powder (lubricant-mixed silver powder) in this manner is thought to contribute to suitable production of the silver powders according to the present examples.

With regards to the first silver powder, it is also thought to be preferable that a value of the difference determined by subtracting the diameter at a cumulative value of 10% from the diameter at a cumulative value of 90% is controlled to 2 or more. In addition, it is thought to be preferable that D50 is controlled to not less than 3 μm and not more than 4 μm. These controls are thought to result in suitable production of the silver powders according to the examples being achieved.

Other productions conditions that are preferable for the method of producing a silver powder according to the present embodiment are described below. As shown in Table 1, the additive amount of the surface treatment agent in the surface treatment agent addition step is preferably not less than 0.05 wt % and not more than 0.15 wt % relative to the weight of silver contained in the silver ammine complex aqueous solution. Moreover, the additive amount of the lubricant is preferably not less than 0.05 wt % and not more than 0.3 wt % relative to the weight of the first silver powder. Furthermore, as shown in Table 2, the additive amount of the lubricant and the attached amount of the surface treatment agent are, in total (i.e., the amount of all fatty acid), preferably not less than 0.1 wt % and not more than 0.4 wt % relative to the weight of silver in the first silver powder.

As set forth above, it is possible to provide a silver powder and a method of producing the same.

Note that embodiments and examples disclosed in the present specification are for illustrative purposes and that embodiments and examples of the present disclosure are not limited thereto and can be modified as appropriate to the extent that they do not deviate from the object of the present disclosure.

INDUSTRIAL APPLICABILITY

The present disclosure is applicable for a silver powder and a method of producing the same.

The invention claimed is:

1. A silver powder that in a volume-based particle size distribution measured using a laser diffraction/scattering particle size distribution measurement instrument, has a diameter at a cumulative value of 50% of 3 μm or more and a ratio of particles of 10 μm or larger of 10% or less, wherein with regards to particle shape observed by image analysis based on an SEM image, the silver powder includes flake-like particles having a major axis of 6 μm or more and irregularly shaped particles having a major axis of less than 6 μm, an average aspect ratio that is a ratio of an average major axis of the flake-like particles relative to an average thickness of the flake-like particles is 8 or more, and a shape factor that is a ratio of an area of a circle having an average maximum length of the irregularly shaped particles as a diameter relative to an average particle area of the irregularly shaped particles is not less than 1.7 and not more than 1.9, and the silver powder has an ignition loss of not less than 0.1 wt % and not more than 0.4 wt %.

2. The silver powder according to claim 1, wherein, in the particle size distribution, a ratio of a value of a difference determined by subtracting a diameter at a cumulative value of 10% from a diameter at a cumulative value of 90% relative to the diameter at the cumulative value of 50% is 2 or more.

3. A conductive paste comprising: the silver powder according to claim 2; a resin; and a solvent.

4. The conductive paste according to claim 3, further comprising a spherical silver powder.

5. A conductive paste comprising: the silver powder according to claim 1; a resin; and a solvent.

6. The conductive paste according to claim 5, further comprising a spherical silver powder.

* * * * *